US010977856B2

(12) United States Patent
Pekelny et al.

(10) Patent No.: US 10,977,856 B2
(45) Date of Patent: Apr. 13, 2021

(54) USING A LOW-DETAIL REPRESENTATION OF SURFACES TO INFLUENCE A HIGH-DETAIL REPRESENTATION OF THE SURFACES

(71) Applicant: Microsoft Technology Licensing, LLC, Redmond, WA (US)

(72) Inventors: Yuri Pekelny, Seattle, WA (US); Oliver Michael Strunk, Munich (DE)

(73) Assignee: Microsoft Technology Licensing, LLC, Redmond, WA (US)

(*) Notice: Subject to any disclaimer, the term of this patent is extended or adjusted under 35 U.S.C. 154(b) by 53 days.

(21) Appl. No.: 15/940,702

(22) Filed: Mar. 29, 2018

(65) Prior Publication Data

US 2019/0304169 A1 Oct. 3, 2019

(51) Int. Cl.
*G06T 15/20* (2011.01)
*G01B 11/02* (2006.01)
(Continued)

(52) U.S. Cl.
CPC .......... *G06T 15/205* (2013.01); *G01B 11/026* (2013.01); *G02B 27/017* (2013.01);
(Continued)

(58) Field of Classification Search
CPC ....... G06T 15/205; G06T 15/08; G06T 17/20; G06T 19/006; G06T 17/00;
(Continued)

(56) References Cited

U.S. PATENT DOCUMENTS 8,624,891 B2 * 1/2014 Bowles ................ H04N 13/261
345/419
2003/0046617 A1 * 3/2003 MacPherson ........... G06T 17/20
714/48
(Continued)

FOREIGN PATENT DOCUMENTS

EP 3195270 B1 10/2018

OTHER PUBLICATIONS

PCT Search and Written Opinion in PCT Application No. PCT/US2019/022383, dated Jun. 11, 2019, 23 pages.
(Continued)

*Primary Examiner* — Chante E Harrison

(57) ABSTRACT

A computer-implemented technique is described herein for generating a digital representation of real-world surfaces in an environment. The technique involves receiving sensor data captured by one or more depth-sensing devices. The technique then provides a low-detail (LD) representation of surfaces in the physical environment based on the sensor data; that LD representation describes one or more planes in the physical environment. The technique then generates a high-detail (HD) representation of the surfaces based on the sensor data and the LD representation. Finally, the technique provides an output result based on the LD representation and/or the HD representation. According to one illustrative aspect, the technique produces the HD representation such that it is non-duplicative of information that is already present in the LD representation. The technique performs this task by identifying and excluding HD information that is already adequately represented by the LD representation.

20 Claims, 13 Drawing Sheets

(51) Int. Cl.
  *G02B 27/01* (2006.01)
  *G06T 15/08* (2011.01)
  *G06T 17/20* (2006.01)
  *G06T 19/00* (2011.01)
  *G06T 17/00* (2006.01)
  *H04N 13/344* (2018.01)
  *H04N 13/271* (2018.01)
(52) U.S. Cl.
  CPC .......... *G02B 27/0172* (2013.01); *G06T 15/08* (2013.01); *G06T 17/00* (2013.01); *G06T 17/20* (2013.01); *G06T 19/006* (2013.01); *G02B 2027/014* (2013.01); *G02B 2027/0138* (2013.01); *G02B 2027/0147* (2013.01); *G06T 2200/08* (2013.01); *H04N 13/271* (2018.05); *H04N 13/344* (2018.05)
(58) Field of Classification Search
  CPC ............ G06T 2200/08; G02B 27/0172; G02B 2027/0147; G02B 27/017; G02B 2027/0138; G02B 2027/014; G01B 11/026; H04N 13/271; H04N 13/344
  See application file for complete search history.

(56) References Cited

U.S. PATENT DOCUMENTS

| | | | | |
|---|---|---|---|---|
| 2003/0052878 | A1* | 3/2003 | Han | G06T 15/205 345/420 |
| 2006/0290695 | A1* | 12/2006 | Salomie | G06T 17/20 345/420 |
| 2012/0194516 | A1 | 8/2012 | Newcombe et al. | |
| 2014/0184749 | A1* | 7/2014 | Hilliges | G06T 17/00 348/47 |
| 2014/0368504 | A1* | 12/2014 | Chen | G06T 17/005 345/424 |
| 2015/0178988 | A1 | 6/2015 | Montserrat et al. | |
| 2016/0027215 | A1* | 1/2016 | Burns | G02B 27/0172 345/419 |
| 2016/0364907 | A1 | 12/2016 | Schoenberg | |
| 2017/0069108 | A1* | 3/2017 | Su | H04N 13/271 |
| 2018/0096463 | A1* | 4/2018 | Kim | G06T 5/002 |
| 2019/0197786 | A1* | 6/2019 | Molyneaux | G06T 7/187 |
| 2019/0362533 | A1* | 11/2019 | Fuller | G06T 15/40 |
| 2019/0368865 | A1* | 12/2019 | Corkum | G01B 11/026 |

OTHER PUBLICATIONS

Curless, et al., "A Volumetric Method for Building Complex Models from Range Images," in Proceedings of the 23rd Annual Conference on Computer Graphics and Interactive Techniques, 1996, pp. 303-312.

Dzitsiuk, "De-noising, Stabilizing and Completing 3D Reconstructions On-the-go using Plane Priors," available at <<https://arxiv.org/abs/1609.08267>>, in arXiv:1609.08267v2 [cs.CV], Mar. 28, 2017, 8 pages.

Newcombe, et al., "KinectFusion: Real-Time Dense Surface Mapping and Tracking," in Proceedings of the 2011 10th IEEE International Symposium on Mixed and Augmented Reality, 2011, 10 pages.

Lorensen, et al., "Marching Cubes: A High Resolution 3D Surface Construction Algorithm," in Computer Graphics, vol. 21, No. 4, 1987, 7 pages.

Ochmann, et al., "Automatic reconstruction of parametric building models from indoor point clouds," in Computers & Graphics 54, 2015, 10 pages.

Schnabel, et al., "Efficient RANSAC for Point-Cloud Shape Detection," in Computer Graphics Forum, vol. 26, Issue 2, 2007, 12 pages.

* cited by examiner

PRODUCING THE HIGH-DETAIL SURFACE
1302

FUSE THE SENSOR DATA INTO VOXELS, EACH VOXEL REPRESENTING AT LEAST A SIGNED DISTANCE FUNCTION VALUE THAT IDENTIFIES A DISTANCE OF THE VOXEL TO A NEAREST SURFACE
1304

FOR EACH VOXEL, STORE PLANE-PROXIMITY INFORMATION IN MEMORY THAT IDENTIFIES: WHETHER THE VOXEL LIES WITHIN A DISTANCE $D$ TO A NEAREST PLANE IDENTIFIED BY THE LD REPRESENTATION OF THE SURFACES; AND AN IDENTITY OF THAT NEAREST PLANE
1306

GENERATE, USING THE VOXELS, CANDIDATE MESH TRIANGLES THAT DESCRIBE THE SURFACES
1308

FOR EACH CANDIDATE MESH TRIANGLE, DETERMINE, BASED ON THE PLANE-PROXIMITY INFORMATION ASSOCIATED WITH THE VOXELS, WHETHER EACH OF ITS VERTICES LIES WITHIN THE DISTANCE $D$ OF A NEAREST PLANE, TO PROVIDE A PROXIMITY STATUS FOR EACH VERTEX
1310

DECIDE WHETHER TO INCLUDE EACH CANDIDATE MESH TRIANGLE IN A HIGH-DETAIL (HD) REPRESENTATION OF THE SURFACES BASED ON THE PROXIMITY STATUS OF EACH OF ITS VERTICES
1312

FIG. 13

UPDATE PROCESSING
1502

RECEIVE ADDITIONAL SENSOR DATA THAT DESCRIBES THE SURFACES IN THE PHYSICAL ENVIRONMENT
1504

UPDATE THE LD REPRESENTATION OF THE SURFACES BASED ON THE ADDITIONAL SENSOR DATA, TO PROVIDE AN UPDATED LD REPRESENTATION OF THE SURFACES
1506

REEVALUATE, BASED ON THE UPDATED LD REPRESENTATION, WHAT HD INFORMATION SHOULD BE INCLUDED IN THE HD REPRESENTATION AND WHAT HD INFORMATION SHOULD BE EXCLUDED FROM THE HD REPRESENTATION
1508

FIG. 15

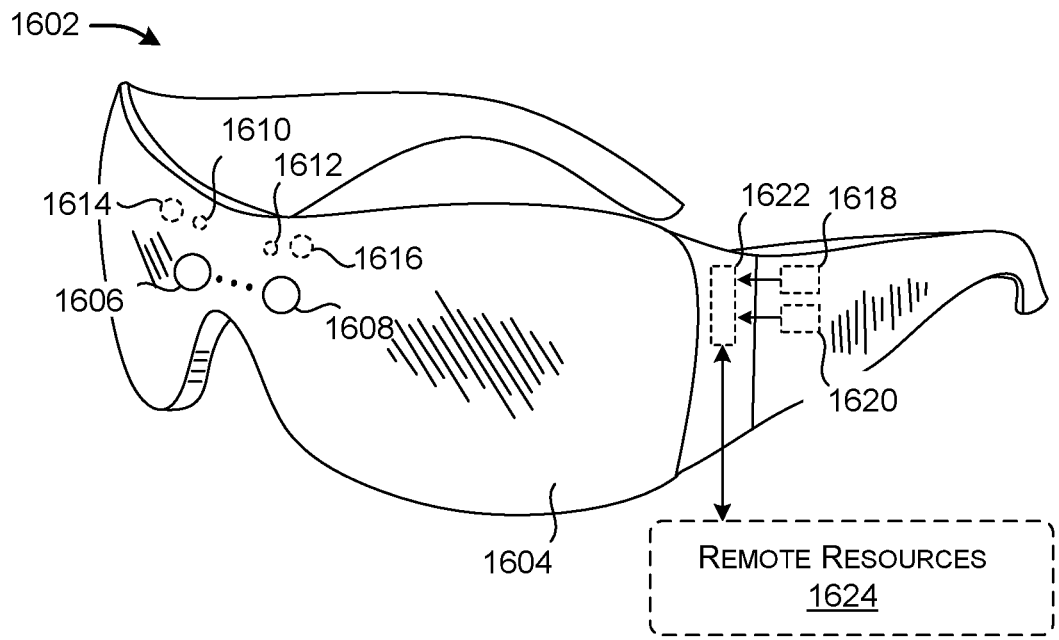

USING A LOW-DETAIL REPRESENTATION OF SURFACES TO INFLUENCE A HIGH-DETAIL REPRESENTATION OF THE SURFACES

BACKGROUND

Graphics systems often produce different versions of objects having different respective amounts of detail. For example, a computer-implemented game can produce a high-detail representation of an object when the object appears in the foreground of a scene, and a low-detail representation of the object when the object appears in the background. Graphics system often generate different versions of an object by first providing a high-detail version of the object, and then converting the high-detail version into a low-detail version of the object. In some cases, this solution may be inefficient and produce unsatisfactory results.

SUMMARY

A computer-implemented technique is described herein for generating a digital representation of real-world surfaces in an environment. The technique involves receiving sensor data captured by one or more depth-sensing devices. The technique then provides a low-detail (LD) representation of surfaces in the physical environment based on the sensor data; that LD representation describes one or more planes in the physical environment. The technique then generates a high-detail (HD) representation of the surfaces based on the sensor data and the LD representation. Finally, the technique provides an output result based on the LD representation and/or the HD representation.

According to one illustrative aspect, the technique produces the HD representation such that it does not duplicate information that is already present in the LD representation. The technique performs this task by identifying and excluding HD information that is already adequately represented by the LD representation. Although excluded, the technique retains the HD information in memory; this enables the technique to further process the HD information in a later update operation.

According to another illustrative aspect, the technique can combine the LD representation with the HD representation to produce a combined-detail surface. By virtue of the fact that the HD representation explicitly excludes information that is already expressed by the LD representation, the technique can combine the LD representation with the HD representation without producing artifacts caused by duplicative information.

According to another aspect, the technique snaps mesh vertices (associated with the HD representation) to a nearest plane, when those mesh vertices are deemed sufficiently close to that plane. This feature reduces noise-like aberrations in the combined-detail surface.

According to another aspect, the technique stores plane-proximity information in memory that identifies the proximity of different parts of the surfaces to one or more planes. This technical feature provides a memory-efficient way of expressing the relationship between different parts of the surfaces and the plane(s) described by the LD representation.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 shows a process which provides an overview of one manner by which the computing system (of FIG. 1) generates the HD representation.

FIG. 15 shows a process that represents one way in which the computing system (of FIG. 1) updates the HD representation upon an update in the LD representation.

FIG. 16 shows a head-mounted display (HMD) that can incorporate the computing system of FIG. 1.

Figure 1:
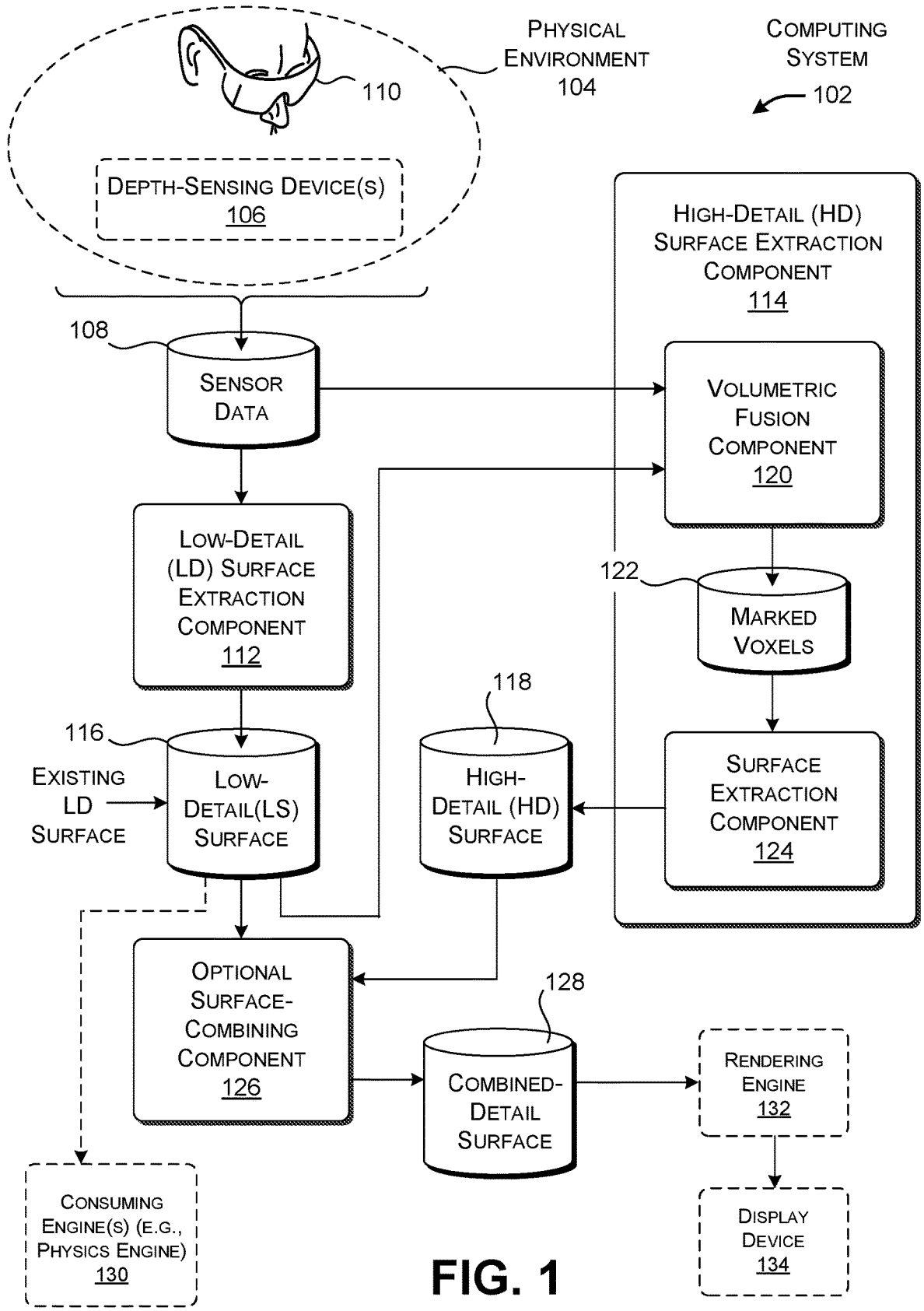
FIG. 1 shows an illustrative computing system that generates a low-detail (LD) representation and a high-detail (HD) representation of real-world surfaces in a physical environment.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing system for generating a low-detail (LD) representation and a high-detail (HD) representation of real-world surfaces in a physical environment. Section B sets forth illustrative methods which explain the operation of the computing system of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing System

FIG. 1 shows an illustrative computing system 102 that generates a low-detail representation and a high-detail representation of real-world surfaces in a physical environment 104. To facilitate explanation, the low-detail representation of the surfaces will be henceforth referred to as an "LD surface," while the high-detail representation of the surfaces will be referred to referred to as an "HD surface."

The LD surface represents surfaces associated with a first level of detail, while the HD surface represents surfaces associated with a second level of detail. For example, as will be described below, the physical environment 104 may represent one or more rooms of an indoor environment (although the techniques described herein are not restricted to indoor environments). Here, the LD surface may represent large planes in that indoor environment, such as wall parts, floor parts, and ceiling parts. The HD surface may present all remaining detail in the indoor environment that is larger than a user-specifiable level of detail D.

Other implementations can produce an LD surface that encompasses other large planar surfaces in the physical environment 104, such as table-tops, whiteboards, etc. Alternatively, or in addition, other implementations can produce an LD surface that encompasses large non-planar surfaces, such as large curved walls, etc. However, to facilitate and simplify explanation, the computing system 102 will be described below in the illustrative context in which the LD surface principally describes large planes within the physical environment 104.

The computing system 102 collects sensor data from one or more depth-sensing devices 106, and stores the sensor data in a data store 108. A depth-sensing device corresponds to a mechanism that operates in the physical environment 104 to measure distances between a reference point (typically associated with the depth-sensing device itself) and physical surfaces in the environment. A depth-sensing device can use any technique to perform this operation, such as a time-of-flight (ToF) technique, a stereoscopic technique, a structured light technique, etc.

In some non-limiting implementations, all or some of the components of the computing system 102 are implemented by a head-mounted display (HMD) 110. The HMD 110 provides a mixed-reality environment. In some implementations, the mixed-reality environment combines a digital representation of the surfaces in the physical environment 104 with virtual objects (such as virtual game characters, etc.).

In other implementations, the depth-sensing devices 106 perform the dedicated task of collecting sensor data, that is, without also processing the sensor data to identify the LD surface and the HD surface. For example, the depth-sensing devices 106 can correspond to one or more mobile robots that rove within the physical environment 104. Or the depth-sensing devices 106 may correspond to one or more KINECT devices provided by MICROSOFT CORPORATION of Redmond, Wash., or the like. The KINECT devices can be positioned at fixed and/or movable locations in the physical environment 104.

In some implementations, the computing system 102 relies on a single user to provide the sensor data. That single user performs this task by moving about the physical environment 104 while the user's depth-sensing device collects sensor data. Through this process, the user provides an increasingly detailed sampling of the physical environment 104. In other implementations, the computing system 102 collects sensor data from plural depth-sensing devices controlled by plural users who move around in the physical environment 104.

The computing system 102 processes the sensor data using two principal components: a low-detail (LD) surface extraction component 112 and a high-detail (HD) surface extraction component 114. The LD surface extraction component 112 generates (or otherwise provides) the LD surface, while the HD surface extraction component 114 provides the HD surface. The LD surface extraction component 112 stores the LD surface in a data store 116, while the HD surface extraction component 114 stores the HD surface in a data store 118.

From a high-level perspective, the HD surface extraction component 114 leverages the LD surface (produced by the LD surface extraction component 112) such that the HD surface excludes high-detail (HD) information that is already adequately represented by the LD surface. In other words, the HD surface extraction component 114 builds "on top" of the LD surface without duplicating the content already present in the LD surface. This strategy has various technical advantages, specified in greater detail below.

The LD surface extraction component 112 can use different techniques to identify the LD surface. In one approach, the LD surface extraction component 112 identifies a set of principal planar surfaces in the physical environment 104 based on the sensor data. The LD surface extraction component 112 then extends those surfaces such that they intersect. The intersection of planar surfaces defines a plurality of cells. The LD surface extraction component 112 then identifies whether each cell represents an interior portion of a room (associated with the physical environment 104) or an exterior portion. The LD surface extraction component 112 finally merges contiguous cells associated with interior portions, and merges contiguous cells associated with exterior portions. The extracted LD surface defines the boundary between the interior and the exterior cells. Additional information regarding one non-limiting implementation of the LD surface extraction component 112 is provided below with reference to FIG. 6.

In yet other cases, information may already exist that describes the principal planar surfaces in the physical environment 104. For example, a computer-aided design (CAD) system may provide information that describes the shapes and arrangements of a room's walls, floors, ceilings, etc. Alternatively, or in addition, a crowdsourcing platform may provide information that describes the principal characteristics of the room. In these cases, the computing system 102 retrieves this information from the appropriate source(s), and stores this information in the data store 116.

As to the HD surface extraction component 114, a volumetric fusion component 120 produces a plurality of voxels based on the sensor data. Each voxel represents a three-dimensional portion of the physical environment 104, such as, without limitation, a 4 cm-cubed portion of the physical environment 104. The volumetric fusion component 120 stores various information associated with each voxel, to produce a marked voxel. The information includes (but is not limited to): (a) the distance of the voxel to the closest surface in the physical environment (corresponding to any surface, not limited to planes); (b) an identifier that specifies whether the voxel is within distance D of one of the planes identified in the LD surface; and (c) the ID associated with a plane (if the voxel is indeed with the distance D of that plane). In response to its processing, the volumetric fusion component 120 stores a collection of marked voxels in a data store 122.

A surface extraction component 124 identifies a mesh that composes the HD surface. The surface extraction component 124 operates by generating a plurality of candidate mesh triangles for consideration. For each candidate mesh triangle, the surface extraction component 124 determines whether it is appropriate to add the triangle to the output mesh associated with the HD surface. As will be described in detail below, the surface extraction component 124 performs this task by determining whether each vertex of a candidate mesh triangle is within the distance D to a principal plane. This yields a proximity status for each vertex, e.g., corresponding to "near" or "far." The surface extraction component 124 determines whether it is appropriate to add a triangle to the output mesh based on the proximity statuses of its three vertices. From a high-level perspective, the surface extraction component 124 will reject those candidate mesh triangles that are sufficiently close to a plane; this manner of operation is based on the premise that these triangles are already adequately represented by the plane.

Note that, while the surface extraction component 124 may reject some candidate mesh triangles, it does not delete the information associated with those triangles. Rather, it retains this information. By virtue of this provision, the HD surface extraction component 114 can efficiently revisit its previous decisions with respect to the inclusion/exclusion of mesh triangles at a later time, e.g., upon the receipt of additional sensor data. For example, the HD surface extraction component 114 can efficiently revisit its decisions upon generating a more refined understanding of the LD surface.

An optional surface-combining component 126 combines the LD surface (in the data store 116) with the HD surface (in the data store 118) to provide a combined-detail surface, which it then stores in a data store 128. In other words, the surface-combining component 126 superimposes the HD surface onto the LD surface to produce the combined-detail surface. The combined-detail surface omits (or reduces the incidence of) redundant content because the HD surface extraction component 114 explicitly produces the HD surface such that it omits content already present in the LD surface. This characteristic, in turn, improves the appearance and usefulness of the combined-detail surface.

The computing system 102 can make use of the various surfaces described above (including the LD surface, the HD surfaced, and the combined-detail surface) in an environment-specific manner. In one implementation, an LD surface-consuming engine 130 performs analysis using the LD surface. For example, assume that the LD surface identifies the walls and floor of a room. A game's physics engine may rely on the LD surface to determine the behavior of the game. For example, the physics engine may control a virtual ball such that it appears to bounce when it strikes the floor of the physical environment 104, and when it strikes a wall in the physical environment 104.

A rendering engine 132 can optionally display the combined-detail surface on a display device 134. For example, in the context of the HDM 110, the rendering engine 132 can display the combined-detail surface on the HDM's display screen. Or the rendering engine 132 can present the combined-detail surface on a retinal display system provided by the HDM 110, etc.

The rendering engine 132 can leverage the HD surface and/or the combined-detail surface to display a scene to the viewer that omits occluded surfaces. For example, assume that a game running on the computing system 102 seeks to present a virtual character or other virtual object within a representation of a physical environment. The rendering engine 132 can use the HD surface and/or the combined-detail surface to determine which surface(s) lie in front of the virtual character at a given time, from the vantage point of the user's current viewing perspective. The rendering engine 132 can then properly depict the virtual character as being partially or wholly occluded by these surface(s). The rendering engine 132 can perform this display-related task using known techniques, such as z-buffering and z-culling.

The above description set forth the manner in which the computing system 102 processes a single instance of sensor data. In some implementations, the computing system 102 operates in an online (dynamic) mode in which it processes successive instances of the sensor data that it receives from the depth-sensing devices 106. In this mode of operation, the computing system 102 continuously refines the LD surface, the HD surface, and the combined-detail surface (if used).

The computing system 102 updates its surfaces in an efficient manner. This is because an update operation often involves reevaluating information already generated by the computing system 102, rather than regenerating that information completely from "scratch." The computing system 102 accomplishes this goal, in part, by leveraging the efficient way in which it codes the relationships between the high-detail parts of a scene and the principal planar surfaces in a scene.

In certain instances, the computing system 102 can also update its surfaces in an efficient piecemeal manner. For instance, assume that the computing system 102 determines that one plane of the LD surface has changed. The computing system 102 can selectively update only those portions of the HD surface that are affected by the modification made to the LD surface.

Further note that each voxel stores relatively sparse information that can be computed without relation to information stored by neighboring voxels. This allows the computing system 102 to efficiently and quickly update the voxels upon the receipt of new sensor data. That is, the computing system 102 can update a voxel based on only: new sensor data; information regarding the LD surface; and the existing values associated with that voxel. This characteristic also enables the computing system 102 to leverage highly parallel computing hardware (such as GPUs, ASICs, etc.) to perform update operations, further improving the efficiency of the update operations.

In summary, the computing system 102 of FIG. 1 applies a first process to generate a LD surface and a second process to generate an HD surface. The computing system 102 feeds the LD surface and the HD surface to whatever downstream components consume these surfaces (e.g., to an LD surface-consuming engine 130, a rendering engine 132, etc.). The first and second processes, while serving different ends, are interrelated; this is because the computing system 102 leverages the LD surface to influence its generation of the HD surface. This interrelation between the first and second processes increases the efficiency of the computing system 102 in generating and updating surfaces (e.g., in terms of its use of processing and memory resources). The interrelation between the first and second processes also ensures that their surfaces can be seamlessly integrated in the manner specified above.

Consider the operation of the computing system 102 in relation to a traditional graphics system. A traditional graphics system may perform the initial step of producing a high-detail representation of the surfaces in the environment. The traditional graphics system may then simplify the high-detail representation and/or attempt to cure deficiencies with respect to the high-detail representation. This process is opposite to that used by the computing system 102. Further, unlike the computing system 102 shown in FIG. 1, a traditional graphics system does not code a scene with linking information which relates high-detail content with low-detail content. Hence, a traditional graphics system's transformation of high-detail content to low-detail content is a one-way memoryless process; this means that the traditional graphics system does not preserve information pertaining to the transformation it has performed for later reuse. This makes the traditional graphics system less efficient than the computing system 102 of FIG. 1.

Figure 2:
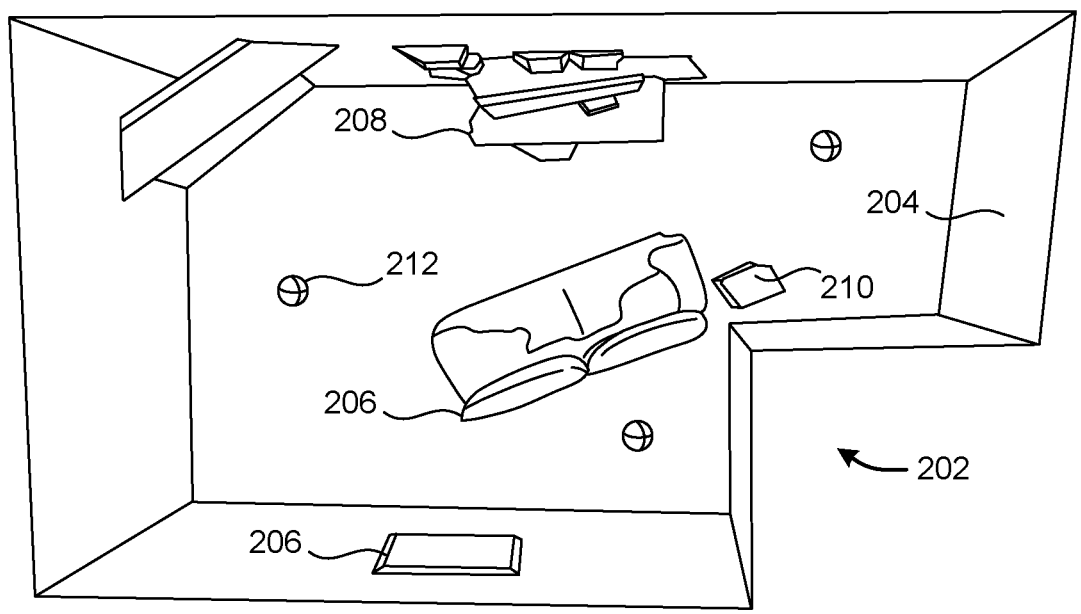
FIG. 2 shows an example of an indoor physical environment, corresponding to a room.

FIG. 2 shows an example of one physical environment 202. It includes principal planar surfaces, such as the illustrative wall 204. It also includes high-detail objects, such as a couch 206, an entertainment center 208, an end table 210, a ball 212 resting on the floor, a piece of artwork 214 hanging on the wall, and so on. This assortment of objects is merely illustrative. A user-specifiable value D determines the level of detail that will contribute to the HD surface generated by the computing system 102. For instance, if D is set at 4 cm, the computing system 102 might not distinguish the artwork 214 from the wall on which it hangs, depending on how far the artwork 214 protrudes from the wall.

Figure 3:
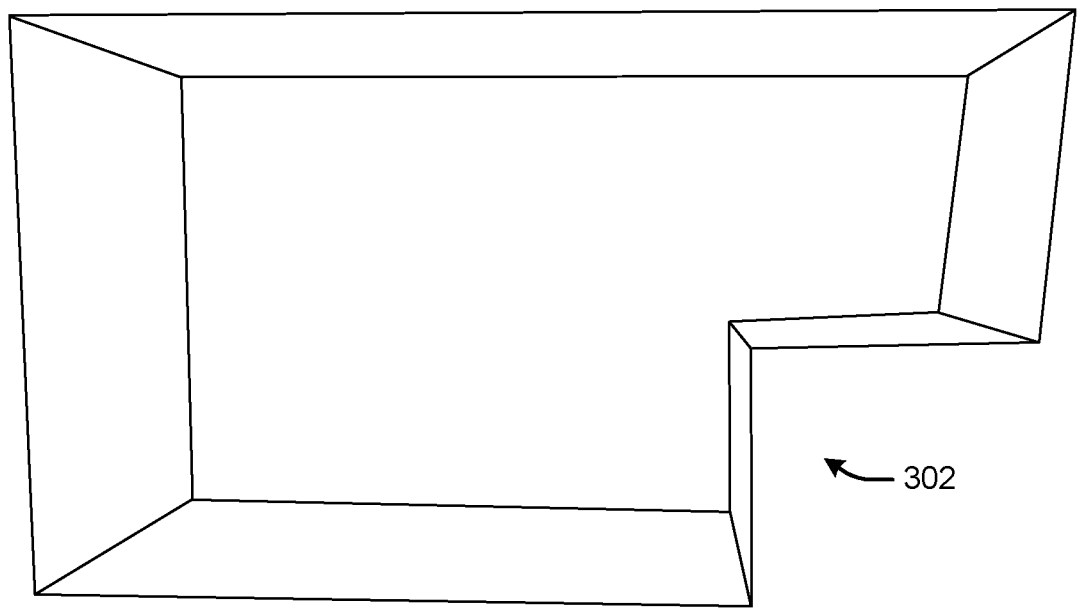
FIG. 3 shows an LD representation of the surfaces in the physical environment of FIG. 2, as produced by the computing system of FIG. 1.

FIG. 3 shows an LD surface 302 produced by (or imported by) the LD surface extraction component 112 of FIG. 1. As shown, the LD surface 302 shows six principal walls of the physical environment 202, together with the floor of the physical environment. In other implementations, the LD surface 302 can represent other principal surfaces, such as tabletops, whiteboards, curved surfaces, etc. (although not present in the particular physical environment 202 shown in FIG. 2).

Figure 4:
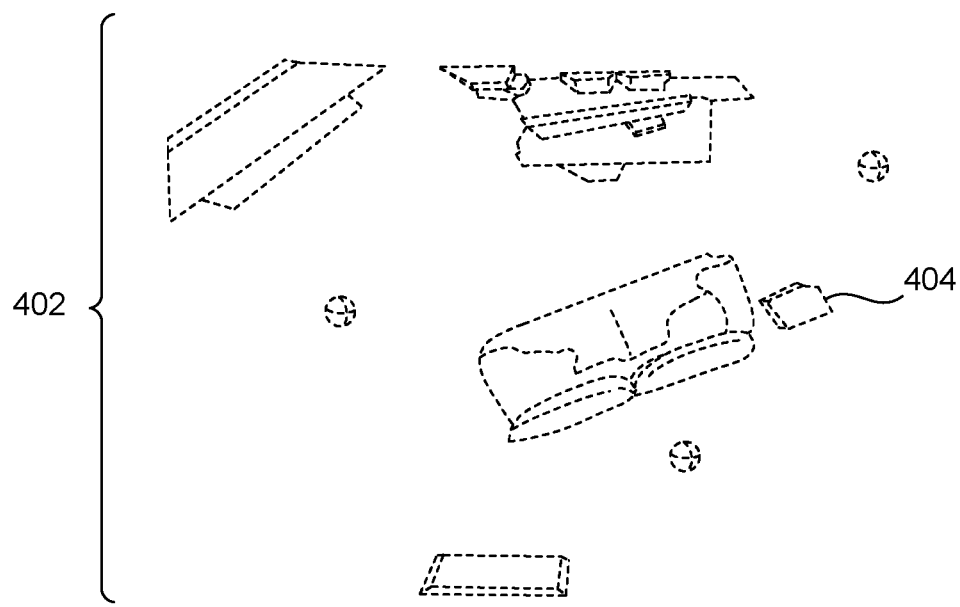
FIG. 4 shows an HD representation of the surfaces in the physical environment of FIG. 2, as produced by the computing system of FIG. 1.

FIG. 4 shows an HD surface 402 produced by the HD surface extraction component 114 of FIG. 1. The HD surface 402 includes all the objects in the physical environment 202 characterized by a level of detail larger than the distance D. Consider the end table 210 shown in FIG. 2. The HD surface 402 represents the end table 210 as a high-detail surface part 404. Note that the HD surface extraction component 114 may determine that a small portion of the end table's surface, corresponding to that portion that is closest to the floor, is adequately represented by the plane associated with the floor itself. Hence, the HD surface extraction component 114 will omit this small portion from the high-detail surface part 404 when generating the output mesh. (This fine level of detail, however, is too small to see in FIG. 4.)

Figure 5:
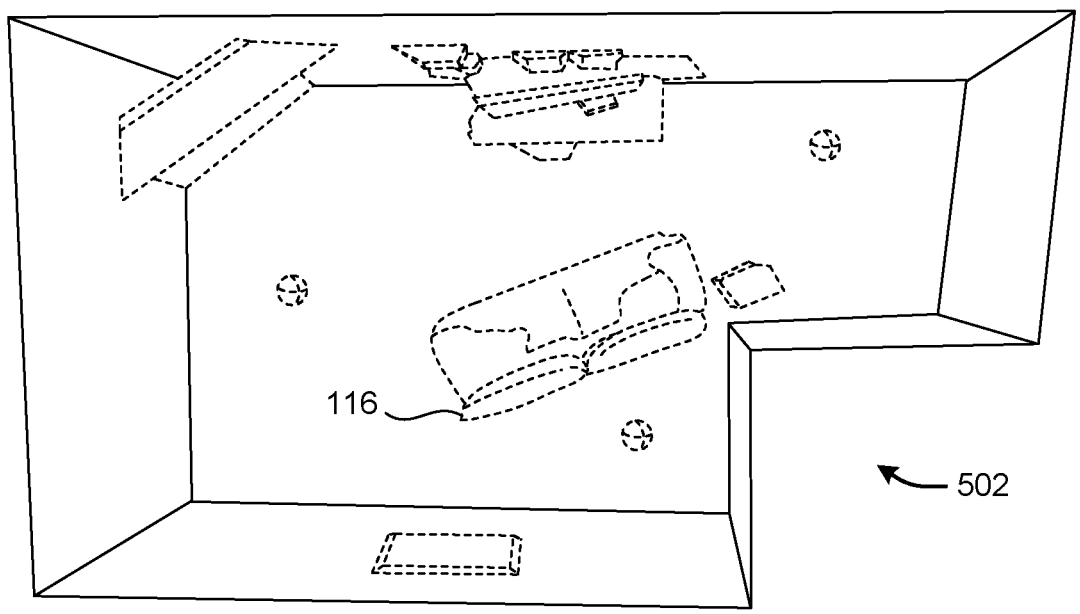
FIG. 5 shows a combination of the LD representation (of FIG. 3) and the HD representation (of FIG. 4), to yield a combined-detail surface.

FIG. 5 shows a combined-detail surface 502 produced by combining the LD surface 302 of FIG. 3 and the HD surface of FIG. 4. That is, the surface-combining component 126 produces the combined-detail surface 502 by layering the HD surface 402 on top of the LD surface 302. The combined-detail surface 502 includes no (or a reduced number of) artifacts because it omits (or reduces the occurrence of)

redundant content. For example, the combined-detail surface 502 does not include double-inclusion of the wall surfaces, floor surfaces, etc.

Figure 6:
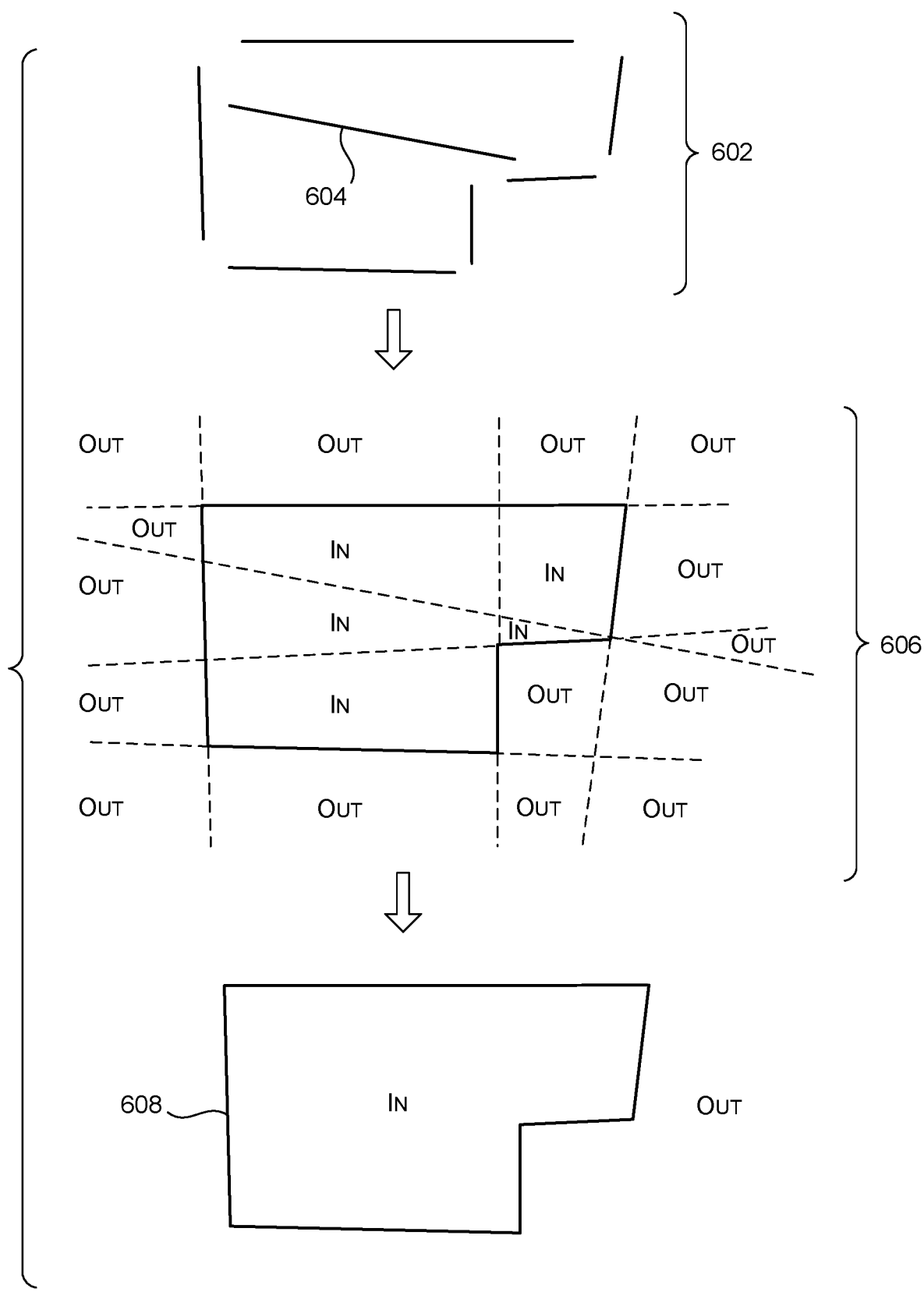
FIG. 6 depicts processing steps associated with one non-limiting technique for generating the LD representation of FIG. 3.

FIG. 6 depicts processing steps associated with one non-limiting technique for generating the LD surface of FIG. 3. In a first step, the LD surface extraction component 112 identifies the principal planar surfaces in the physical environment 202. Generally, the LD surface extraction component 112 identifies a principal plane by finding a collection of points that: (a) lie on a same plane, as defined by a same plane equation (Ax+By+Cz+D=0); and (b) collectively define an area having at least a prescribed size. Here, A, B, C, and D represent constant values that define a particular plane. (Note that D in this context does not refer to the threshold distance value described above.)

The LD surface extraction component 112 can use different techniques to find planes. For instance, the LD surface extraction component 112 can use the random sample consensus (RANSAC) algorithm to identify a set of most probable planes based on the sensor data. The RANSAC algorithm operates by randomly selecting three points that define a candidate plane. It then generates a score for that plane based on the amount of sensor data that conforms to the plane. The RANSAC algorithm repeats this operation by choosing other planes, each time comparing a new candidate plane's score with the best score determined thus far. When finished, the top n scores identify the most probable set of planes in a scene. In other implementations, the LD surface extraction component 112 can identify planes using the Hough transform, by clustering candidate surfaces into groups based on each surface's surface normal and distance to the coordinate system origin, etc.

FIG. 6 identifies a set of planes 602 identified by the LD surface extraction component 112. The set of planes 602 can include one or more erroneous planes (such as illustrative plane 604), attributed to noise in the sensor data and/or other anomaly-inducing factors.

In a next step, the LD surface extraction component 112 extends the planes so that they intersect with other. This yields a plurality of volumetric cells 606, with each cell corresponding to a portion of the 3D space defined by the intersections.

In a next step, the LD surface extraction component 112 labels each cell to identify whether it corresponds to a region inside the room ("IN") or outside the room ("OUT"). For more complex multi-room physical environments (not shown), the LD surface extraction component 112 can also label each cell to identify the room to which it most likely pertains.

The LD surface extraction component 112 can perform the above-described labeling operation in different ways, such as by using an energy-minimization approach. For example, in that approach, the LD surface extraction component 112 can determine the net cost for each permutation of labels assigned to the cells, for a plurality of possible permutations. The LD surface extraction component 112 then selects the combination of labels that yields the lowest cost.

To consider the cost of any particular combination of labels, the LD surface extraction component 112 assigns a cost to each label assigned to each cell. The LD surface extraction component 112 then accumulates the costs associated with all of the cells, for that particular combination of labels. For example, the LD surface extraction component 112 can assess a cost for labeling a cell as "IN" based on the number of depth measurements taken within or near that cell that confirm the conclusion that the cell lies within the room, and the number of depth measurements that contradict this conclusion. The LD surface extraction component 112 can also assess a cost for labeling a current cell under consideration as "IN" based on the characteristics of one or more neighboring cells in relation to the current cell, etc.

In another case, the LD surface extraction component 112 can label the cells using a machine-trained model. In yet another case, the LD surface extraction component 112 can classify a cell as "IN" when a number of confirmatory depth measurements taken within or near the cell exceed an environment-specific threshold value (e.g., without making use of an energy minimization technique).

In a final step, the LD surface extraction component 112 can merge all contiguous "IN" cells and all contiguous "OUT" cells. The boundary between the merged "IN" cells and the merged "OUT" cells defines the LD surface 608, when viewed from above.

Figures 7, 8:
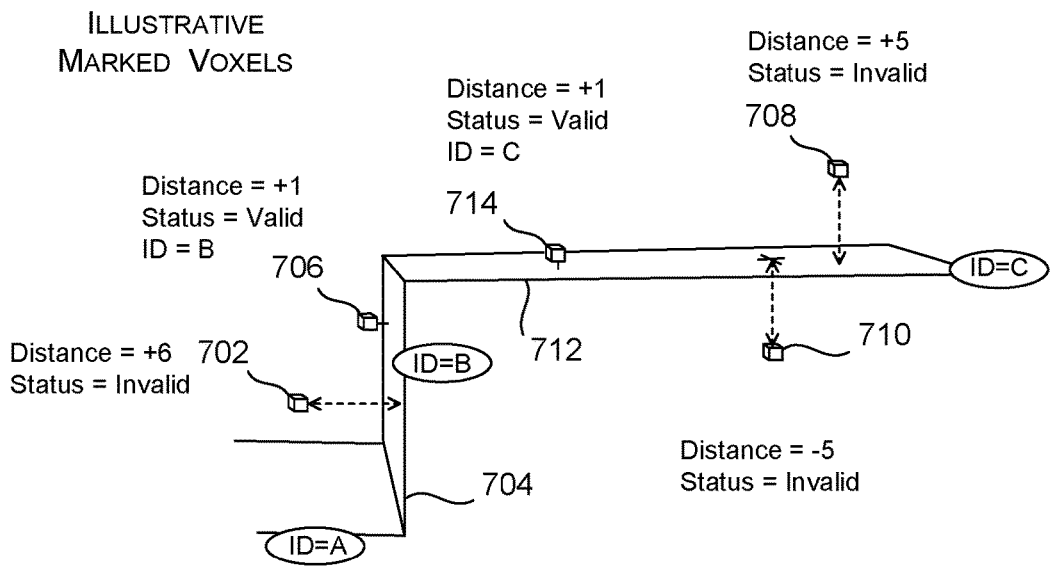
FIG. 7 shows examples of voxels in relation to identified planes.
FIG. 8 shows a two-dimensional representation of the kind of voxels shown in FIG. 7.

FIGS. 7 and 8 illustrate the operation of the volumetric fusion component 120, introduced in FIG. 1. The volumetric fusion component 120 begins by generating a plurality of voxels. As described above, each voxel corresponds to a three-dimensional cubical portion of space. The volumetric fusion component 120 stores a signed distance function (SDF) value associated with each voxel, or a truncated signed distance function (TSDF) value. An SDF value indicates the distance of the voxel to the nearest surface (corresponding to any surface, not necessarily a planar surface). That is, the sign of the SDF value reflects whether the voxel lies outside the closest surface (from the perspective of the depth-sensing devices 106) or inside the closest surface. The magnitude of the SDF value indicates how far the voxel is from the closest surface. For a TSDF value, the distance is set to a default value (and thereby truncated) when the distance exceeds a prescribed threshold value. As used herein, the acronym SDF encompasses both non-truncated and truncated distance functions.

The volumetric fusion component 120 may base an SDF value on a single depth measurement or multiple depth measurements. The volumetric fusion component 120 can generate an SDF value based on multiple depth measurements by forming a weighted average of those depth measurements.

In addition to raw SDF information, the volumetric fusion component 120 provides information that describes the proximity of each voxel to the closest surface associated with the LD surface. More specifically, in one implementation, the volumetric fusion component 120 can store a status identifier for each voxel which indicates whether that voxel lies at a distance d that is within a distance D of a closest plane (e.g., d≤D). If this condition is met, the volumetric fusion component 120 can also store an ID associated with the closest plane. Assume here that D equals 4 units, such as 4 cm.

FIG. 7 illustrates the above concepts with respect to five illustrative voxels. (Note that the space is filled with other voxels, although FIG. 7 only shows five voxels for simplicity.) A first voxel 702 lies six units from its closet surface (surface B 704). Therefore, the volumetric fusion component 120 stores an SDF value (+6) that indicates that the first voxel 702 lies six units outside the nearest surface, together with a status identifier value of "invalid" to reflect that it does not lie within D units of the nearest plane (the surface B 704). A second voxel 706 lies within one unit from its closest surface (the surface B 704). Hence, the volumetric fusion component 120 stores an SDF value (+1), together with a status identifier value of "valid" and a surface ID of "B." The "valid" indicator reflects the fact that the second voxel 706 lies within distance D to its closet surface.

Similarly, the volumetric fusion component 120 marks a third voxel 708 with an SDF value of +5 and a status identifier of "invalid." It marks a fourth voxel 710 with an SDF of value of −5 and a status identifier of "invalid." The negative sign associated with the fourth voxel 710 indicates that this voxel 710 lies inside a closest surface 712 (surface C). Finally, the volumetric fusion component 120 marks a fifth voxel 714 that lies within the distance D with: an SDF value of +1, a status identifier of "valid," and surface ID of "C."

More specifically, note that FIG. 7 represents one specialized and simplified scenario in which the SDF values reflect the closest distances to the planes in the LD surface. But this is not necessarily the case. Recall that the volumetric fusion component 120 computes each SDF value based on the closest surface (corresponding to any surface) that is detectable based on the received sensor data, which is collected in the course of an observer moving about in the physical environment 104. The volumetric fusion component 120 computes each status identifier based on the distance between a voxel and the nearest plane of the LD surface. The situation may occur in which the sensor data reveals that a voxel is very close to a surface (such as the surface of the couch 206), but that surface itself is not close to a planar surface. Here, the SDF value of the voxel would be small (relative to D), but the voxel would nonetheless be labeled with an invalid status identifier (because it is far from all the planes in the LD surface). In another circumstance, a plane of the LD surface identified by the LD surface extraction component 112 might be far from any surface detected by the sensor data (e.g., a floor below the couch); the volumetric fusion component 120 might therefore assign a voxel that is close to that plane a large SDF value (relative to D), such as −6 (e.g., based on its distance from a surface that is detectable based on the sensor data). But the volumetric fusion component 120 may nonetheless assign that voxel a status identifier of "valid" because it knows that it lies close to the LD surface extracted by the LD surface extraction component 112.

FIG. 8 shows a two-dimensional cross section of voxels on either side of the surface C 712. Note that any two neighboring voxels that have different SDF signs indicates that a surface lies between these two voxels at a zero-crossing point. For example, the surface C 712 lies between the neighboring voxel pair (802, 804) which have different signs. A zone 806 includes a set of voxels having a status identifier "valid," indicating that they lie within a prescribed distance to the planar surface C 712. As will be described below, the surface extraction component 124 may merge some high-detail surface information that lies within this zone 806 with the underlying plane associated with the surface C 712.

Overall, the volumetric fusion component 120 stores information regarding the relationship of voxels and planes in a memory-efficient manner. For example, the volumetric fusion component 120 can achieve this result by adding only two new fields to the voxel, e.g., a first corresponding to its status as "valid" or "invalid," and a second corresponding to its closet surface (if the voxel has a "valid" status). The volumetric fusion component 120 can alternatively achieve the same result using a single field; that single field will store either "invalid" or a plane ID. The storage of a plane ID implies that the voxel is "valid." (Note that each voxel in FIG. 8 that is labeled in FIG. 8 as "invalid" also stores an SDF value, but that information is omitted from FIG. 8 to simplify the illustration.)

Figure 9:
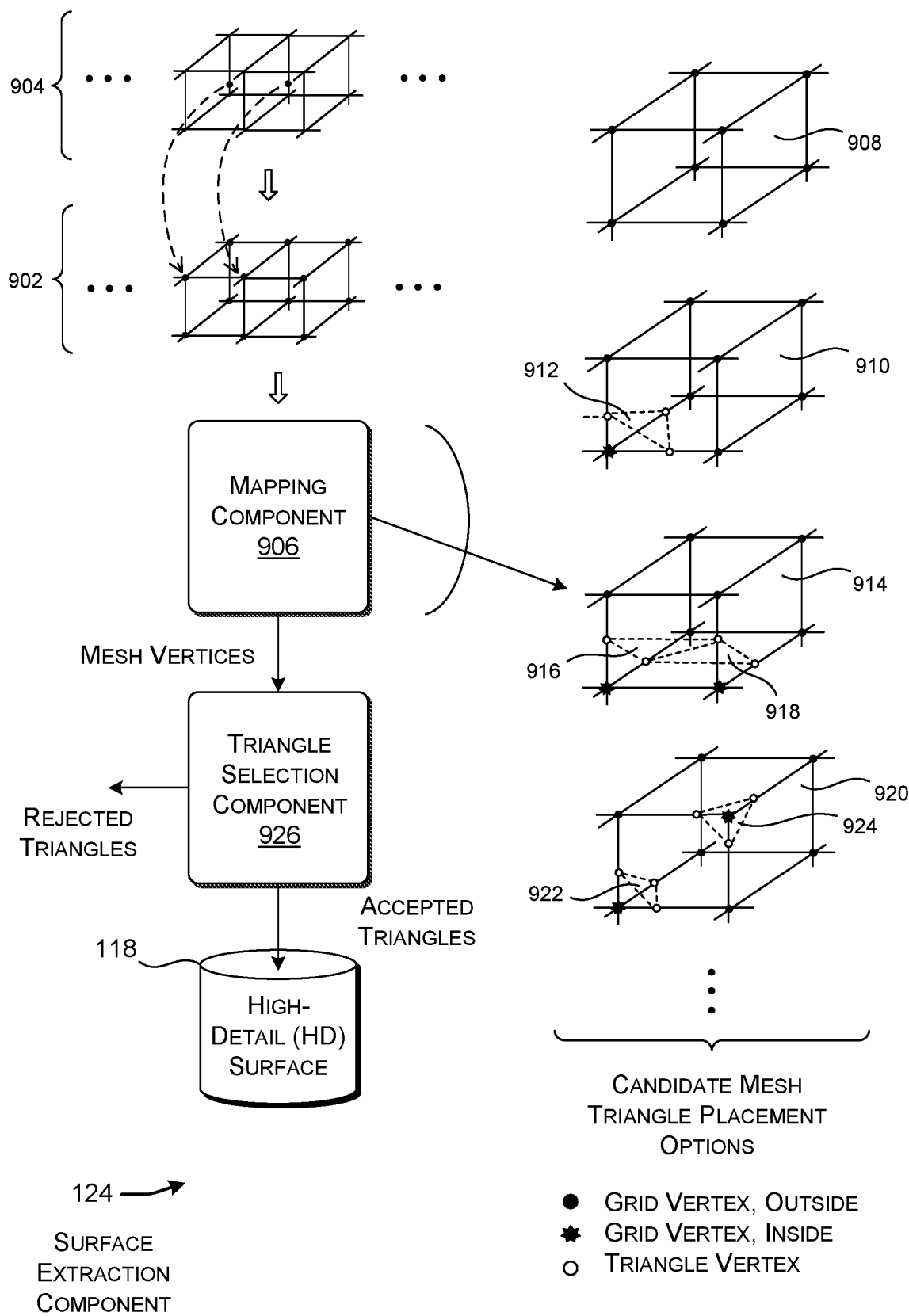
FIG. 9 shows one implementation of a surface extraction component, which is a component of the computing system of FIG. 1.

Advancing to FIG. 9, this figure shows one implementation of the surface extraction component 124. The surface extraction component 124 operates on a grid 902 that defines a collection of cubes (referred to herein as "grid cubes"). The grid 902 includes cube vertices that correspond to the centers of the voxels 904 described above in connection with FIGS. 7 and 8. That is, each grid cube in the grid 902 has eight cube vertices. Each cube vertex, in turn, corresponds to a center of a voxel. Each cube vertex is also associated the above-described information stored by an individual voxel.

A cube vertex having a positive SDF value corresponds to a voxel that lies outside of its closest surface (as in the example of voxel 708 of FIG. 7); such a cube vertex is said herein to have the vertex status of "out." A cube vertex having a negative SDF value corresponds to a voxel that lies inside its closet surface (as in the example of voxel 710); such a cube vertex is said herein to have the vertex status of "in."

A mapping component 906 maps each set of cube vertices associated with a grid cube to zero, one, or more candidate mesh triangles. The mapping component 906 performs this task by mapping each set of eight grid vertices (together with the "in"/"out" status of each vertex) to a predetermined combination of candidate mesh vertices. For example, a first option 908 includes no candidate triangles; this option 908 is appropriate for the case when all eight of the grid vertices lie outside of the closest surface. A second option 910 includes a single candidate mesh triangle 912; this option 910 is appropriate for the case in which only one of the grid vertices has an "in" status. A third option 914 includes two conjoined candidate mesh triangles (916, 918) which together form a rectangle; this option 914 is appropriate for the case in which the grid vertices include only two adjacent vertices on a cube face that have the "in" status. A fourth option 920 includes diagonally disposed candidate mesh triangles (922, 924) on one face of its cube; this option is appropriate when only two diagonally disposed vertices on a single face have the "in" status, and so on. The explanation refers to each triangle as a "candidate" mesh triangle because the surface extraction component 124 may or may not select this mesh triangle for inclusion in the HD surface.

The mapping component 906 also places each triangle vertex at an appropriate position on the edge along which it lies. The mapping component 906 can perform this task in various ways, such as by using linear interpolation to select the position of a triangle vertex. That is, the mapping component 906 selects the location of the triangle vertex based on the SDF values associated with the cube vertices on either side of it.

A triangle selection component 926 determines whether each candidate mesh triangle identified by the mapping component 906 should be added to the output mesh (e.g., corresponding to the HD surface stored in the data store 118). The triangle selection component 926 begins this process by marking each triangle vertex associated with the grid cube with a proximity status of either "near" or "far." It marks a triangle vertex as "near" when the vertex lies within a distance D to a nearest planar surface 1002 (e.g., d≤D). It marks a triangle vertex as "far" when the vertex lies outside the distance D (e.g., d>D). Again assume here that the value of D is 4. (The triangle selection component 926 can determine the distance of each mesh vertex to the closest plane by determining the distance of a line that extends from the mesh vertex to the nearest plane, and which is normal to that plane.) The triangle selection component 926 then decides whether to accept or reject the triangle based on the "near"/"far" status of its vertices.

Figure 10:
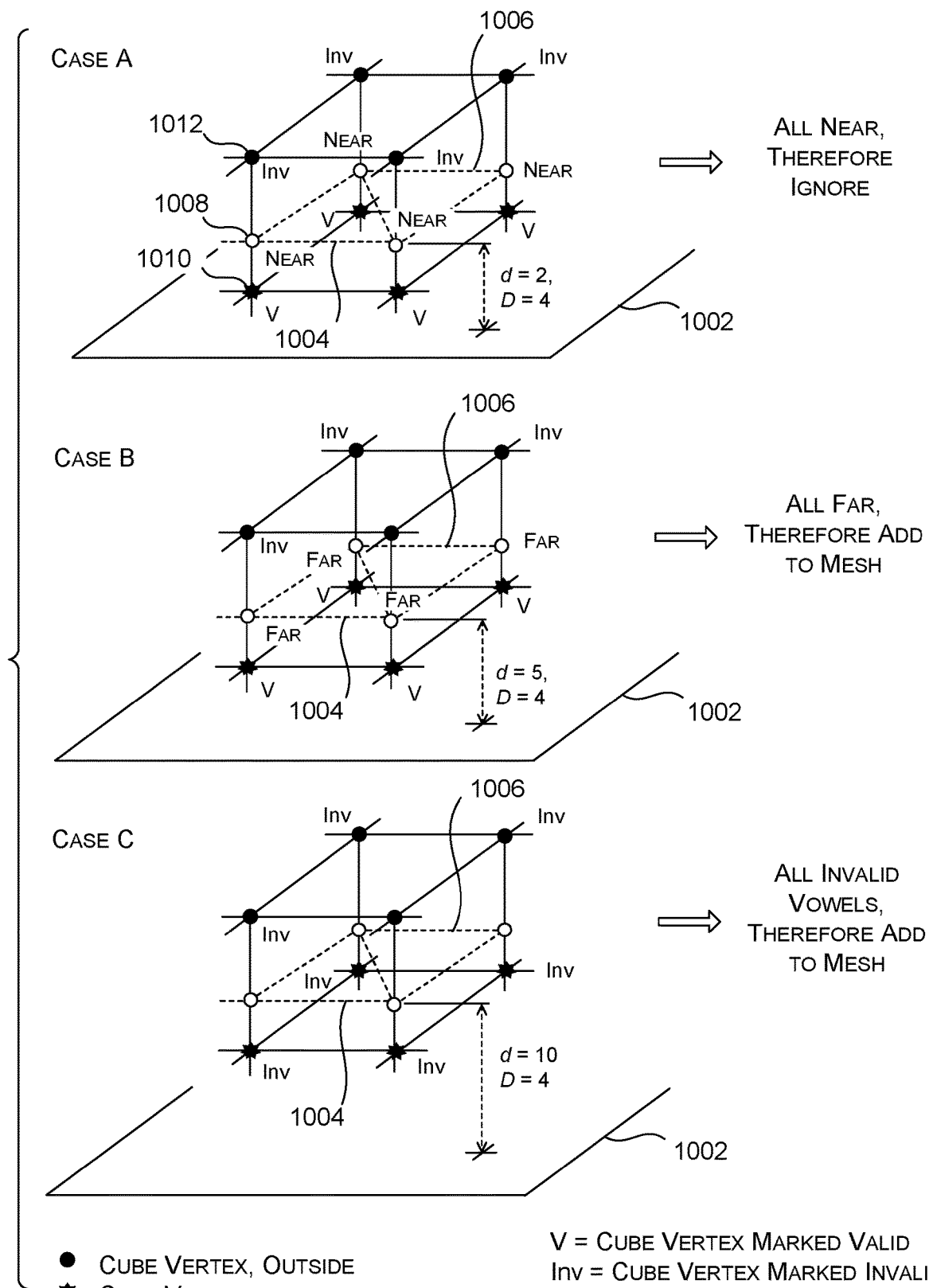
FIGS. 10 and 11 show one manner in which the surface extraction component constructs the HD representation.
Figure 11:
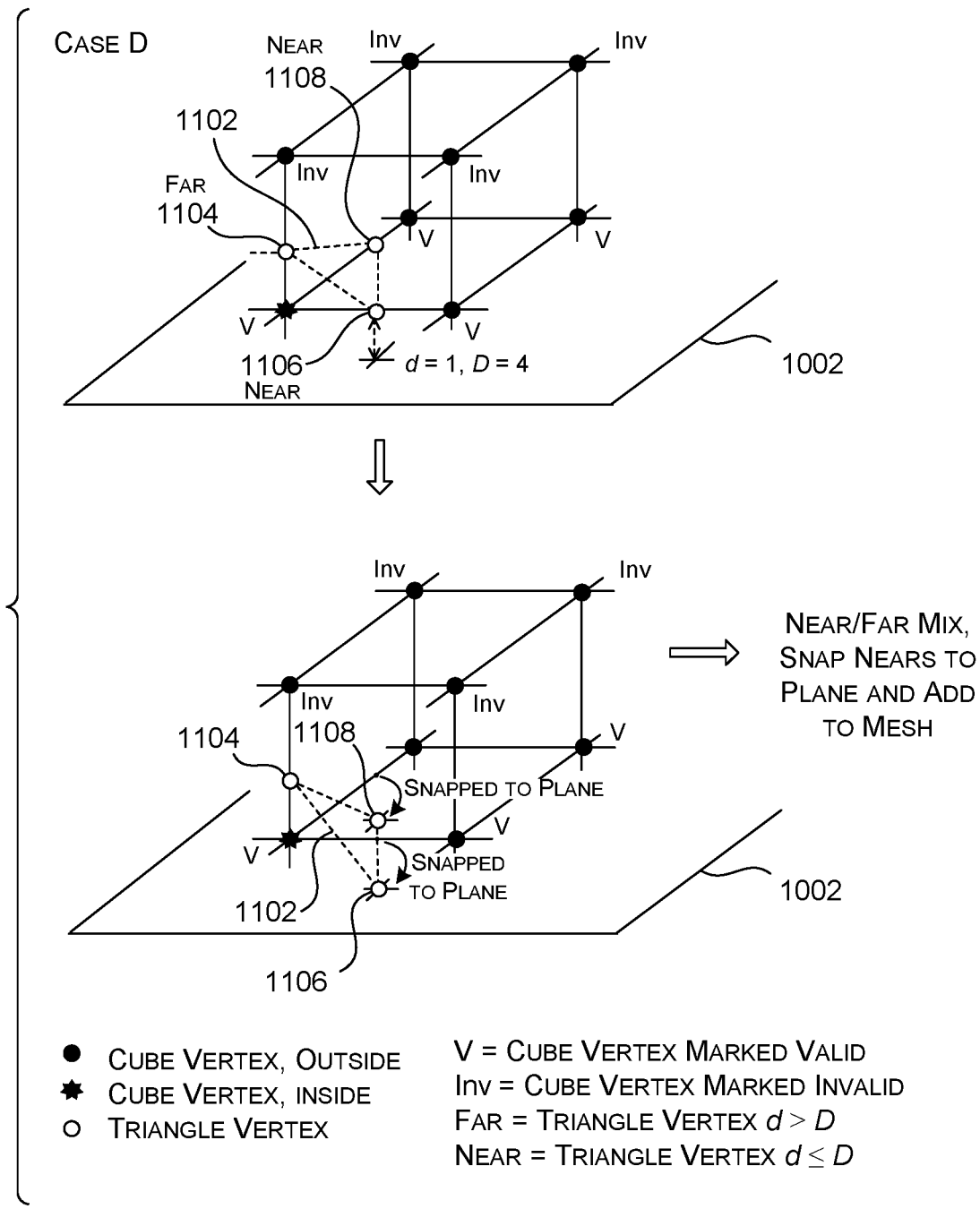

FIGS. 10 and 11 show the manner in which the triangle selection component 926 decides whether to include a grid cube's candidate mesh triangle(s) in the HD surface, with respect to four Cases (A, B, C, and D). Note that FIGS. 10 and 11 are explained with reference to illustrative mapping options chosen by the mapping component 906. But the defining characteristics of each case depend on the proximity statuses of its triangle vertices, rather than the particular option selected by the mapping component 904. In other words, any single case applies to any mapping option produced by the mapping component 904, so long as the proximity statuses of its triangle vertices satisfy the rule associated with the case.

To begin with, in Case A, the mapping component 906 identifies two candidate mesh triangles (1004, 1006). Further each triangle vertex neighbors at least one cube vertex having a "valid" status, indicating that it lies within the distance D to the planar surface 1002. For instance, the triangle vertex 1008 lies between the grid vertex 1010 (having the status of "valid") and the grid vertex 1012 (having the status of "invalid"). Case A corresponds to the case in which all three vertices of each triangle have the proximity status of "near." In this situation, the triangle selection component 926 ignores both triangles (1004, 1006), meaning that it will add neither triangle to the output mesh that will define the HD surface. Although not shown, note that the triangle selection component 926 would have reached the same conclusion if each triangle vertex was positioned between two grid vertices labeled as "valid," instead of lying between a grid vertex labeled "valid" and a grid vertex labeled "invalid," as shown.

To provide a more concrete example, Case A might correspond to the case in which the surface associated with the triangles (1004, 1006) corresponds to the artwork 206 hanging on the wall in FIG. 2, and the planar surface 1002 corresponds to the wall. In Case A, the computing system 102 collapses the artwork 206 into the wall because it does not protrude out from the wall to a sufficient extent.

Case B corresponds to same scenario of Case A, with the exception that, in scenario B, all of the mesh triangles have the proximity status of "far." In this case, the triangle selection component 926 adds both candidate mesh triangles (1004, 1006) to the output mesh that will define the HD surface.

Case C corresponds to the case in which all of the cube vertices have the status of "invalid." By definition, this also means that all of the triangle vertices will have the proximity status of "far." Here, the triangle selection component 926 adds both candidate mesh triangles (1004, 1006) to the output mesh.

In Case D, the mapping component 906 identifies a single candidate mesh triangle 1102. The candidate mesh triangle 1102 includes one triangle vertex 1104 having the proximity status of "far" and two triangle vertices (1106, 1108) having the proximity status of "near." The triangle selection component 926 handles this situation by moving the two "near" triangle vertices (1106, 1108) downward so that they lie on the closest point on the planar surface 1002. In other words, the triangle selection component 926 snaps the "near" triangle vertices (1106, 1108) to the closest plane 1002. With this modification, the triangle selection component 926 then adds the candidate mesh triangle 1102 to the output mesh. By virtue of snapping "near" vertices to the closet plane, the surface extraction component 124 improves the appearance of the HD surface when it is added to the LD surface, e.g., by eliminating or reducing the noise-like artifacts that would otherwise occur by placing a surface in very close proximity to an underlying plane.

B. Illustrative Processes

FIGS. 12-15 show processes that explain the operation of the computing system 102 in Section A in flowchart form. Since the principles underlying the operation of the computing system 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

Figure 12:
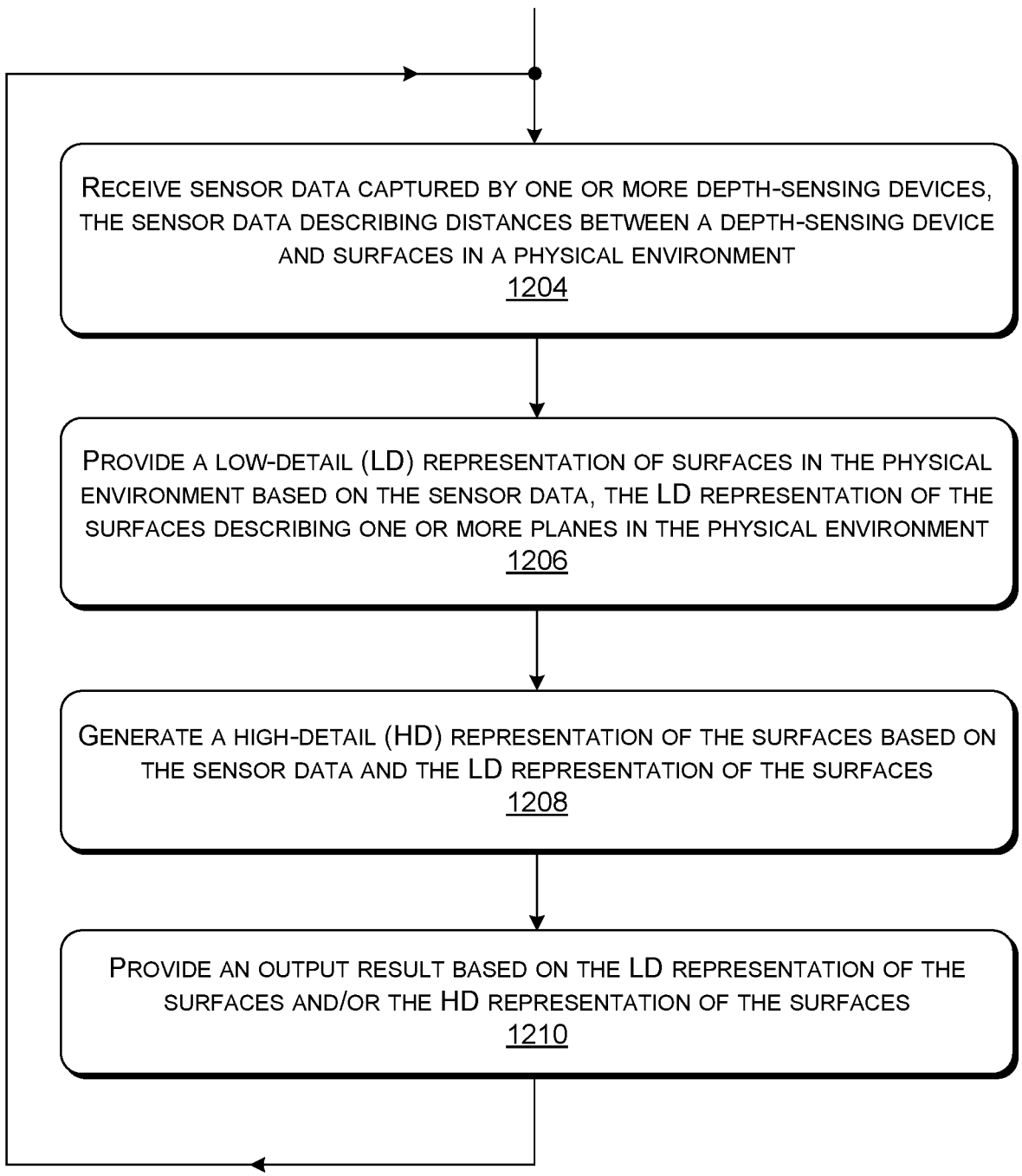
FIG. 12 shows a process which provides an overview of one manner of operation of the computing system of FIG. 1.

FIG. 12 shows a process 1202 which provides an overview of one manner of operation of the computing system 102 of FIG. 1. In block 1204, the computing system 102 receives sensor data captured by one or more depth-sensing devices 106. The sensor data describes distances between a depth-sensing device and surfaces in a physical environment 104. In block 1206, the computing system 102 provides a low-detail (LD) representation of surfaces in the physical environment based on the sensor data. (Note: The LD representation of surfaces is referred to in Section A using the abbreviated phase "LD surface.") The LD representation of the surfaces describes one or more planes in the physical environment. For instance, the LD surface extraction component 112 can generate this LD surface; or the computing device 102 can receive a preexisting LD surface. (In other implementations, the LD representation can describe one or more other types of principal surfaces, besides, and/or in addition to, planar surfaces.) In block 1208, the HD surface extraction component 114 generates a high-detail (HD) representation of the surfaces based on the sensor data and the LD representation of the surfaces. (Note: The HD representation of surfaces is referred to in Section A using the abbreviated phase "HD surface.") In block 1210, the computing system 102 provides an output result based on the LD representation of the surfaces and/or the HD representation of the surfaces.

FIG. 13 shows a process 1302 which provides an overview of one manner of operation of the HD surface extraction component 114. In block 1304, the volumetric fusion component 120 fuses the sensor data into voxels. Each voxel represents at least a signed distance function (SDF) value that identifies a distance of the voxel to a nearest surface (corresponding to any surface, not just a planar surface). In block 1306, for each voxel, the volumetric fusion component 120 stores plane-proximity information in memory that identifies: whether the voxel lies within a distance D to a nearest plane identified by the LD representation; and an identity of that nearest plane. In block 1308, the surface extraction component 124 generates, using the voxels, candidate mesh triangles that describe the surfaces. In block 1310, the surface extraction component 124 determines, for each candidate mesh triangle, and based on the plane-proximity information associated with the voxels, whether each of its vertices lies within the distance D to a nearest plane; this yields a proximity status for each vertex (e.g., corresponding to "near" or "far"). In block 1312, the surface extraction component 124 decides whether to include each candidate mesh triangle in a high-detail (HD) representation of the surfaces based on the proximity status of each of its vertices.

Figure 14:
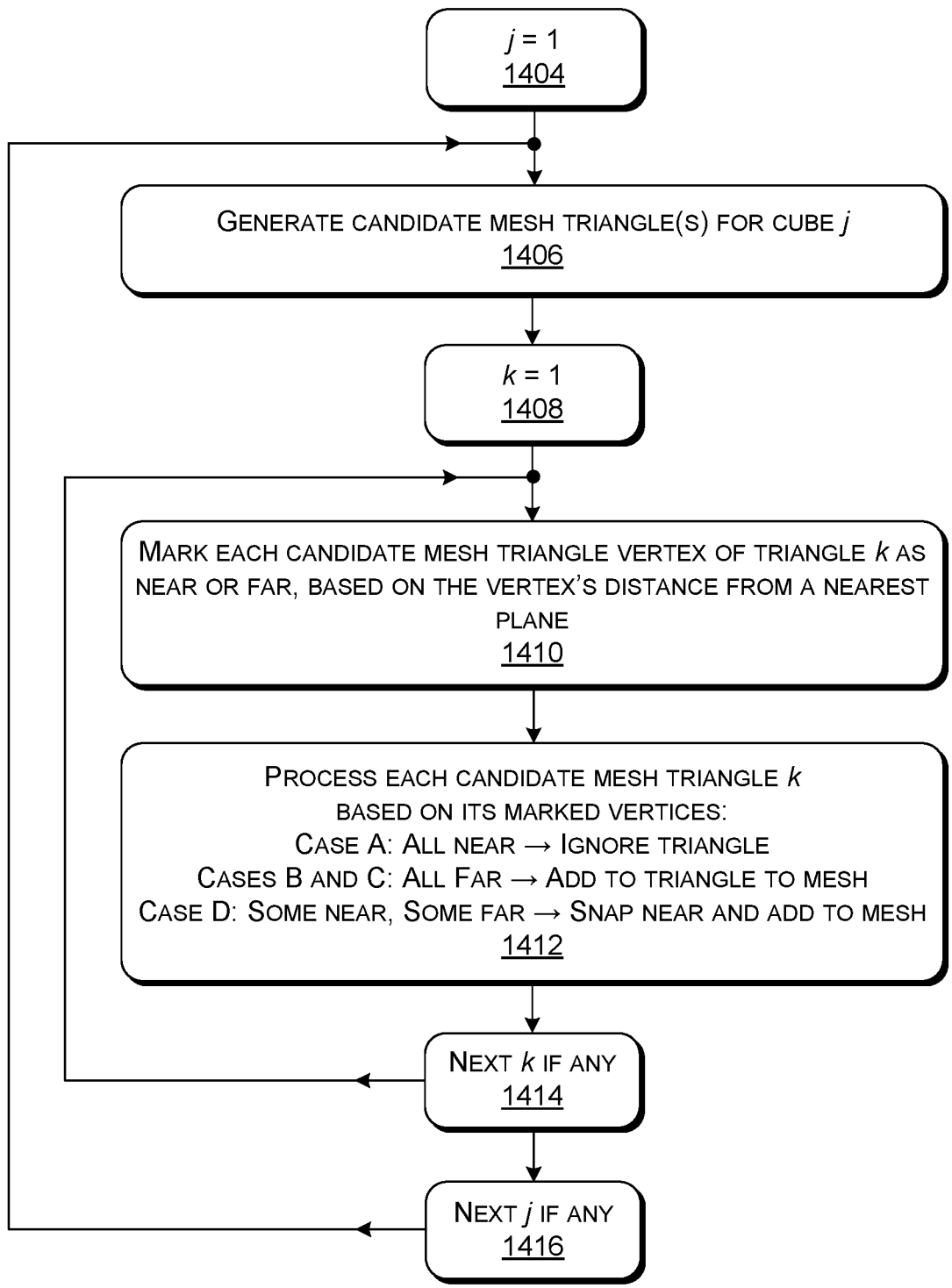
FIG. 14 provides additional illustrative details regarding the process of FIG. 13.

FIG. 14 is a process 1402 that provides additional illustrative details regarding the process 1302 of FIG. 13. In block 1404, the surface extraction component 124 commences with grid cube j. In block 1406, the surface extraction component 124 uses the mapping component 906 to identify a set of zero, one, or more candidate mesh triangles for the grid cube j. In block 1408, the surface extraction component 124 commences with candidate mesh triangle k. In block 1410, the surface extraction component 124 uses the triangle selection component 926 to mark each triangle vertex of triangle k with the proximity status of either "near" or "far" based on the vertex's distance from the nearest plane. In block 1412, the triangle selection component 926 determines whether to include the candidate mesh triangle k in the output mesh based on the proximity statuses of its vertices. In block 1414, the surface extraction component 124 advances to a next candidate mesh triangle. In block 1416, the surface extraction component 124 advances to a next grid cube.

FIG. 15 shows a process 1502 that represents one way in which the computing system 102 (of FIG. 1) updates the HD representation upon an update in the LD representation. In block 1504, the computing system 102 receives additional sensor data that describes the surfaces in the physical environment 104. In block 1506, the computing system 102 updates the LD representation of the surfaces based on the additional sensor data, to provide an updated LD representation of the surfaces. In block 1508, based on the updated LD representation, the computing system 102 reevaluates its decision regarding what HD information should be included in (and excluded from) the HD representation.

The computing system 102 can perform block 1508 in different ways for different kinds of changes in the LD surface. For example, assume that an update in block 1506 indicates that at least one voxel has changed its affiliation with a closest plane. That is, prior to the update, assume that the HD surface extraction component 114 indicates that the voxel is closest to a surface A. After the update, assume that the HD surface extraction component 114 now indicates that the same voxel is closest to a surface B. In this scenario, the HD surface extraction component 114 can repeat its mesh-extraction process described in FIG. 13 for at least the affected voxel(s).

In another scenario, assume that an update in block 1506 indicates that a plane equation of an existing plane has changed in one or more regards, which causes a slight shift of that existing plane. In this scenario, the HD surface extraction component 114 can assume that it has already extracted the correct mesh triangles for the voxels that lie within a distance D of the plane. It can selectively address a change in the plane equation by adjusting the position of any "near" vertex associated with those mesh triangles.

In general, the computing system 102 can selectively adjust only those aspects of the HD surface which have changed. By virtue of this strategy, the computing system 102 can avoid repeating work that has already been performed. This allows the computing system 102 to make more efficient use of computing resources (e.g., processing and memory resources, etc.)

C. Representative Computing Devices

FIG. 16 shows an illustrative head-mounted display (HMD) 1602 that can incorporate the computing system 102 of FIG. 1, or at least aspects of the computing system 102. The HMD 1602 includes a head-worn frame that houses or otherwise affixes a display device 1604, e.g., corresponding to a see-through display device or an opaque (non-see-through) display device. Waveguides (not shown) or other image information conduits direct left-eye images to the left eye of the user and direct right-eye images to the right eye of the user, to overall create the illusion of depth through the effect of stereopsis. Alternatively, the HMD 10602 can incorporate a retinal display system. Although not shown, the HMD 1602 can also include speakers for delivering sounds to the ears of the user.

The HMD 1602 can include any environment-facing imaging components, such as representative environment-facing imaging components 1606 and 1608. The imaging components (1606, 1608) can include RGB cameras, monochrome cameras, a depth-sensing device (including an illumination source), etc. While FIG. 16 shows only two imaging components (1606, 1608), the HMD 1602 can include any number of such components.

The HMD 1602 can optionally include an inward-facing gaze-tracking system. For example, the inward-facing gaze-tracking system can include light sources (1610, 1612) for directing light onto the eyes of the user, and cameras (1614, 1616) for detecting the light (glints) reflected from the eyes of the user.

The HMD 1602 can also include other input mechanisms, such as one or more microphones 1618, an inertial measurement unit (IMU) 1620, etc. The IMU 1620 can include one or more accelerometers, one or more gyroscopes, one or more magnetometers, etc., or any combination thereof.

A control engine 1622 can include logic for performing any of the tasks associated with the computing system 102 described above with reference to FIG. 1. The control engine 1622 may optionally include a communication interface for interacting with remote resources 1624 (e.g., one or more remote servers) via a communication conduit (e.g., via a local area network or a wide area network, etc.). The HMD 1602 can delegate any of the tasks attributed to the computing system 102 to the remote resources 1624. The HMD 1602 can also interact with one or more resources (not shown) that are local with respect to the HMD 1602.

Figure 17:
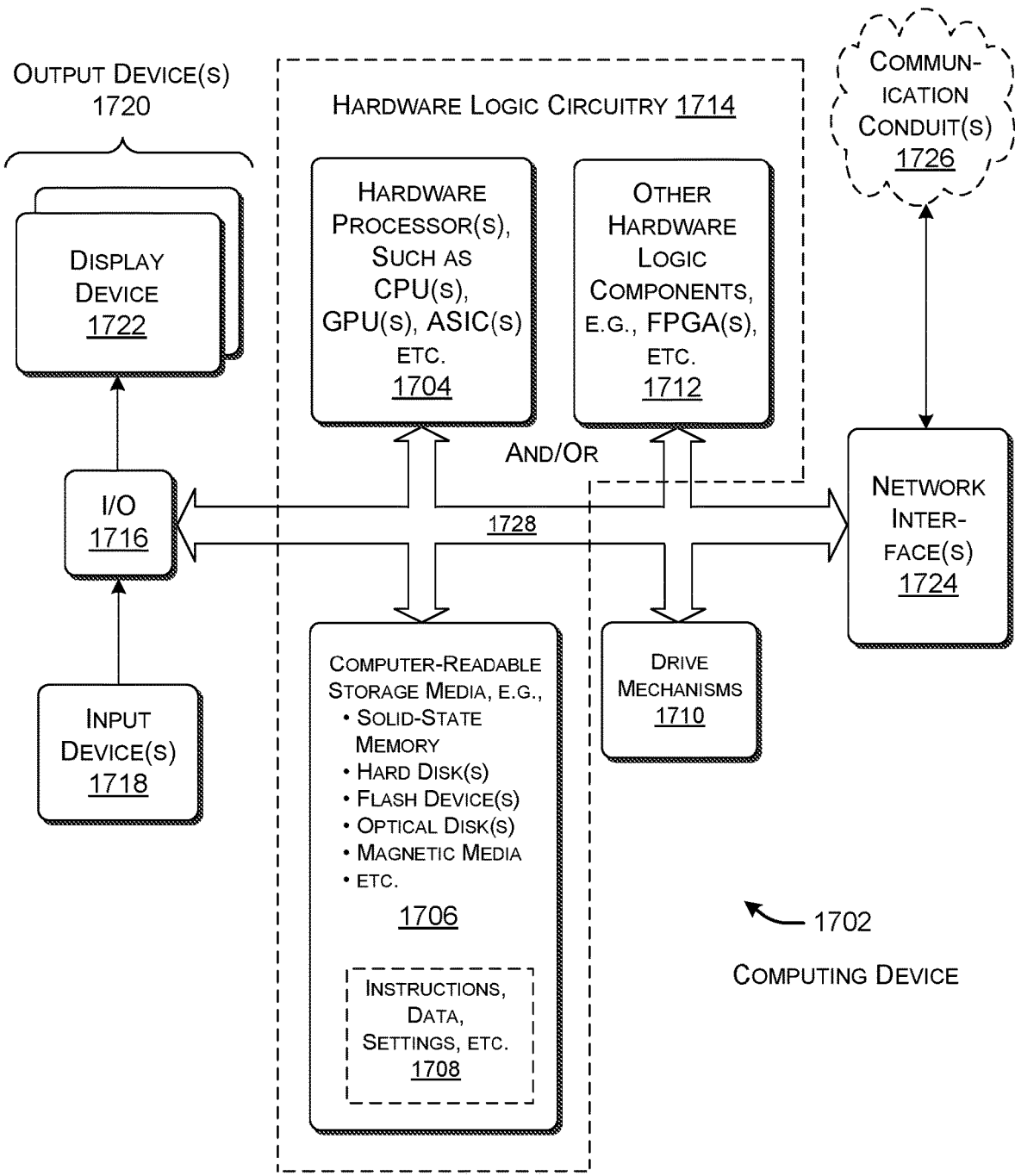
FIG. 17 shows an illustrative type of computing device that can be used to implement any aspect of the features shown in the foregoing drawings.

FIG. 17 shows a computing device 1702 that can be used to implement any aspect of the mechanisms set forth in the above-described figures. For instance, the type of computing device 1702 shown in FIG. 17 can be used to implement the components of the computing system 102 of FIG. 1. In all cases, the computing device 1702 represents a physical and tangible processing mechanism.

The computing device 1702 can include one or more hardware processors 1704. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1702 can also include computer-readable storage media 1706, corresponding to one or more computer-readable media hardware units. The computer-readable storage media 1706 retains any kind of information 1708, such as machine-readable instructions, settings, data, etc. Without limitation, for instance, the computer-readable storage media 1706 may include one or more solid-state devices, one or more magnetic hard disks, one or more optical disks, magnetic tape, and so on. Any instance of the computer-readable storage media 1706 can use any technology for storing and retrieving information. Further, any instance of the computer-readable storage media 1706 may represent a fixed or removable component of the computing device 1702. Further, any instance of the computer-readable storage media 1706 may provide volatile or non-volatile retention of information.

The computing device 1702 can utilize any instance of the computer-readable storage media 1706 in different ways. For example, any instance of the computer-readable storage media 1706 may represent a hardware memory unit (such as Random Access Memory (RAM)) for storing transient information during execution of a program by the computing device 1702, and/or a hardware storage unit (such as a hard disk) for retaining/archiving information on a more permanent basis. In the latter case, the computing device 1702 also includes one or more drive mechanisms 1710 (such as a hard drive mechanism) for storing and retrieving information from an instance of the computer-readable storage media 1706.

The computing device 1702 may perform any of the functions described above when the hardware processor(s) 1704 carry out computer-readable instructions stored in any instance of the computer-readable storage media 1706. For instance, the computing device 1702 may carry out computer-readable instructions to perform each block of the processes described in Section B.

Alternatively, or in addition, the computing device 1702 may rely on one or more other hardware logic components 1712 to perform operations using a task-specific collection of logic gates. For instance, the hardware logic component(s) 1712 may include a fixed configuration of hardware logic gates, e.g., that are created and set at the time of manufacture, and thereafter unalterable. Alternatively, or in addition, the other hardware logic component(s) 1712 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 17 generally indicates that hardware logic circuitry 1714 corresponds to any combination of the hardware processor(s) 1704, the computer-readable storage media 1706, and/or the other hardware logic component(s) 1712. That is, the computing device 1702 can employ any combination of the hardware processor(s) 1704 that execute machine-readable instructions provided in the computer-readable storage media 1706, and/or one or more other hardware logic component(s) 1712 that perform operations using a fixed and/or programmable collection of hardware logic gates.

In some cases (e.g., in the case in which the computing device 1702 represents a user computing device), the computing device 1702 also includes an input/output interface 1716 for receiving various inputs (via input devices 1718), and for providing various outputs (via output devices 1720). One particular output mechanism may include a display device 1722 of any type. The computing device 1702 can also include one or more network interfaces 1724 for exchanging data with other devices via one or more communication conduits 1726. One or more communication buses 1728 communicatively couple the above-described components together.

The communication conduit(s) 1726 can be implemented in any manner, e.g., by a local area computer network, a wide area computer network (e.g., the Internet), point-to-point connections, etc., or any combination thereof. The communication conduit(s) 1726 can include any combination of hardwired links, wireless links, routers, gateway functionality, name servers, etc., governed by any protocol or combination of protocols.

FIG. 17 shows the computing device 1702 as being composed of a discrete collection of separate units. In some cases, the collection of units may correspond to discrete hardware units provided in a computing device chassis having any form factor. In other cases, the computing device 1702 can include a hardware logic component that integrates the functions of two or more of the units shown in FIG. 1. For instance, the computing device 1702 can include a system on a chip (SoC or SOC), corresponding to an integrated circuit that combines the functions of two or more of the units shown in FIG. 17.

The following summary provides a non-exhaustive set of illustrative aspects of the technology set forth herein.

According to a first aspect, one or more computing devices for generating a digital representation of real-world surfaces in an environment are described. The computing device(s) include hardware logic circuitry, the hardware logic circuitry corresponding to: (a) one or more hardware processors that perform operations by executing machine-readable instructions stored in a memory, and/or by (b) one or more other hardware logic components that perform operations using a task-specific collection of logic gates. The operations include: receiving sensor data captured by one or more depth-sensing devices, the sensor data describing distances between a depth-sensing device and surfaces in a physical environment; providing a low-detail (LD) representation of surfaces in the physical environment based on the sensor data, the LD representation of the surfaces describing one or more planes in the physical environment; and generating a high-detail (HD) representation of the surfaces based on the sensor data and the LD representation of the surfaces. The generating operation includes: storing plane-proximity information in memory that identifies proximity of different parts of the surfaces to the plane(s); identifying, based on the plane-proximity information, high-detail (HD) information that is already represented by the LD representation of the surfaces; and excluding the HD information from the HD representation of the surfaces, while retaining the HD information in memory. The operations further include providing an output result based on the LD representation of the surfaces and/or the HD representation of the surfaces.

According to a second aspect, the plane(s) are associated with one or more wall parts in the physical environment, and/or one or more floor parts in the physical environment, and/or one or more ceiling parts in the physical environment.

According to a third aspect, the operations further include receiving a value D that defines a level of detail, and wherein the generating operation identifies the HD information to be excluded from the HD representation of the surfaces based on the value D.

According to a fourth aspect, the generating operation further includes fusing the sensor data into voxels, each voxel representing at least a signed distance function value that identifies a distance of the voxel to a nearest surface identified by the sensor data.

According to a fifth aspect (dependent on the fourth aspect), the storing of plane-proximity information includes, for each voxel, storing plane-proximity information in memory that identifies: whether the voxel lies within a distance D to a nearest plane identified by the LD representation of the surfaces; and an identity of that nearest plane.

According to a sixth aspect, the identifying of HD information includes: generating candidate mesh triangles that describe the surfaces; for each candidate mesh triangle, determining whether each of its vertices lies within a distance D of a nearest plane, to provide a proximity status for each vertex; and deciding whether to include each candidate mesh triangle in the HD representation of the surfaces based on the proximity status of each of its vertices.

According to a seventh aspect (dependent on the sixth aspect), the deciding operation involves including a candidate mesh triangle if all of its vertices lie outside of the distance D to a nearest plane.

According to an eighth aspect (dependent on the sixth aspect), the deciding operation involves excluding a candidate mesh triangle if all of its vertices lie within the distance D to a nearest plane.

According to a ninth aspect (dependent on the sixth aspect), the deciding operation involves including a candidate mesh triangle if at least one of its vertices lies outside of the distance D to a nearest plane and at least one of its vertices lies within the distance D to the nearest plane, but only after having moved any vertex that lies within the distance D to the nearest plane.

According to a tenth aspect, the operations further include: receiving additional sensor data that describes the surfaces in the physical environment; updating the LD representation of the surfaces based on the additional sensor data, to provide an updated LD representation of the surfaces; and reevaluating, based on the updated LD representation, what HD information should be included in the HD representation and what HD information should be excluded from the HD representation.

According to an eleventh aspect, the operations further include combining the LD representation of the surfaces with the HD representation of the surfaces to provide a combined-detail representation of the surfaces.

According to a twelfth aspect, at least one depth-sensing device is associated with a head-mounted display (HMD).

According to a thirteenth aspect, a method is described for generating a digital representation of real-world surfaces in an environment. The method includes: receiving sensor data captured by one or more depth-sensing devices, the sensor data describing distances between a depth-sensing device and surfaces in a physical environment; providing a low-detail (LD) representation of surfaces in the physical environment based on the sensor data, the LD representation of the surfaces describing one or more planes in the physical environment; generating a high-detail (HD) representation of the surfaces based on the sensor data and the LD representation of the surfaces, the generating operation involving excluding HD information from the HD representation of the surfaces that is determined to be already represented by the LD representation of the surfaces, while retaining the excluded HD information in memory; and providing an output result based on the LD representation of the surfaces and/or the HD representation of the surfaces. The method is performed by hardware logic circuitry, the hardware logic circuitry corresponding to: (a) one or more hardware processors that perform operations by executing machine-readable instructions stored in a memory, and/or by (b) one or more other hardware logic components that perform operations using a task-specific collection of logic gates.

According to a fourteenth aspect (dependent on the thirteenth aspect), the generating operation further includes fusing the sensor data into voxels, each voxel representing at least a signed distance function value that identifies a distance to a nearest surface identified by the sensor data.

According to a fifteenth aspect (dependent on the fourteenth aspect), the method further includes, for each voxel, storing plane-proximity information in memory that identifies: whether the voxel lies within a distance D to a nearest plane identified by the LD representation of the surfaces; and an identity of that nearest plane.

According to a sixteenth aspect (dependent on the thirteenth aspect), the method further includes identifying the HD information to be excluded by: generating candidate mesh triangles that describe the surfaces; for each candidate mesh triangle, determining whether each of its vertices lies within a distance D of a nearest plane, to provide a proximity status for each vertex; and deciding whether to include each candidate mesh triangle in the HD representation of the surfaces based on the proximity status of each of its vertices.

According to a seventeenth aspect (dependent on the sixteenth aspect), the deciding operation includes: including a candidate mesh triangle if all of its vertices lie outside of the distance D to a nearest plane; excluding a candidate mesh triangle if all of its vertices lie within the distance D to a nearest plane; and including a candidate mesh triangle if at least one of its vertices lies outside of the distance D to a nearest plane and at least one of its vertices lies within the distance D to the nearest plane, but only after having moved any vertex that lies within the distance D to the nearest plane.

According to an eighteenth aspect (dependent on the thirteenth aspect), the method further includes combining the LD representation of the surfaces with the HD representation of the surfaces to provide a combined-detail representation of the surfaces.

According to a nineteenth aspect (dependent on the eighteenth aspect), the providing operation includes: providing the LD surface to a physics engine for use by the physics engine in simulating interaction of a virtual object with the physical environment; and/or providing the HD surface and/or the combined-detail surface to a rendering engine for use in correctly rendering the virtual object in relation to any surface in the physical environment that occludes the virtual object.

According to a twentieth aspect, a computer-readable storage medium for storing computer-readable instructions is described. The computer-readable instructions, when executed by one or more hardware processors, perform a method that includes: receiving sensor data captured by one or more depth-sensing devices, the sensor data describing distances between a depth-sensing device and surfaces in a physical environment; providing a low-detail (LD) representation of surfaces in the physical environment based on the sensor data, the LD representation of the surfaces describing one or more planes in the physical environment; fusing the sensor data into voxels; for each voxel, storing plane-proximity information in memory that identifies whether the voxel lies within a distance D to a nearest plane identified by the LD representation of the surfaces and an identity of that nearest plane; generating, using the voxels, candidate mesh triangles that describe the surfaces; for each candidate mesh triangle, determining, based on the plane-proximity information associated with the voxels, whether each of its vertices lies within the distance D to a nearest plane, to provide a proximity status for each vertex; deciding whether to include each candidate mesh triangle in a high-detail (HD) representation of the surfaces based on the proximity status of each of its vertices; and providing an output result based on the LD representation of the surfaces and/or the HD representation of the surfaces.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for generating a digital representation of real-world surfaces in a physical environment, comprising:
    hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
    receiving sensor data captured by one or more depth-sensing devices, the sensor data describing distances between a depth-sensing device and the surfaces in the physical environment;
    providing, using a low-detail (LD) surface extraction component, a low-detail (LD) representation of the surfaces in the physical environment based on the sensor data, the LD representation of the surfaces describing one or more planes in the physical environment;
    generating a high-detail (HD) representation of the surfaces based on the sensor data and the LD representation of the surfaces, said generating using a high-detail (HD) surface extraction component, said generating involving:
        storing plane-proximity information in memory that identifies proximity of different parts of the surfaces to said one or more planes provided by the LD surface extraction component;
        identifying, based on the plane-proximity information, high-detail (HD) information that is already represented by the LD representation of the surfaces provided by the LD surface extraction component; and
        excluding the HD information, identified by said identifying, from the HD representation of the surfaces, while retaining the HD information in memory; and
    providing an output result based on the LD representation of the surfaces and/or the HD representation of the surfaces,
    the LD surface extraction component and the HD surface extraction component being two components implemented by the hardware logic circuitry that implement different respective processes configured to provide different kinds of surfaces, the LD surface extraction component implementing a first process for providing the LD representation of the surfaces, and the HD surface extraction component implementing a second process for providing the HD representation of the surfaces based on the LD representation of the surfaces provided by the first process,
    the plane-proximity information in memory serving as linking information that relates the LD representation of the surfaces provided by the LD surface extraction component with the HD representation of the surfaces provided by the HD surface extraction component.

2. The one or more computing devices of claim 1, wherein said one or more planes provided by the LD surface extraction component are associated with one or more wall parts in the physical environment, and/or one or more floor parts in the physical environment, and/or one or more ceiling parts in the physical environment.

3. The one or more computing devices of claim 1, wherein the operations further include receiving a value D that defines a level of detail, and wherein said generating identifies the HD information to be excluded from the HD representation of the surfaces based on the value D.

4. The one or more computing devices of claim 1, wherein said generating further comprises fusing the sensor data into a plurality of voxels, each voxel of the plurality of voxels representing at least a signed distance function value that identifies a distance of the voxel to a nearest surface identified by the sensor data.

5. The one or more computing devices of claim 4, wherein said storing plane-proximity information comprises, for each voxel of the plurality of voxels, storing plane-proximity information in memory that identifies: whether the voxel lies within a distance D to a nearest plane identified by the LD representation of the surfaces provided by the LD surface extraction component; and an identity of that nearest plane.

6. The one or more computing devices of claim 1, wherein said identifying HD information comprises:
    generating a plurality of candidate mesh triangles that describe the surfaces;
    for each candidate mesh triangle of the plurality of candidate mesh triangles, determining whether each of its vertices lies within a distance D to a nearest plane provided by the LD surface extraction component, to provide a proximity status for each vertex; and
    deciding whether to include each candidate mesh triangle in the HD representation of the surfaces based on the proximity status of its vertices.

7. The one or more computing devices of claim 6, wherein said deciding comprises including a candidate mesh triangle if all of its vertices lie outside of the distance D to the nearest plane provided by the LD surface extraction component.

8. The one or more computing devices of claim 6, wherein said deciding comprises excluding a candidate mesh triangle if all of its vertices lie within the distance D to the nearest plane provided by the LD surface extraction component.

9. The one or more computing devices of claim 1, wherein the operations further include:
receiving additional sensor data that describes the surfaces in the physical environment;
updating the LD representation of the surfaces based on the additional sensor data, to provide an updated LD representation of the surfaces; and
reevaluating, based on the updated LD representation, what HD information should be included in the HD representation and what HD information should be excluded from the HD representation.

10. The one or more computing devices of claim 1, wherein the operations further comprise combining the LD representation of the surfaces with the HD representation of the surfaces to provide a combined-detail representation of the surfaces, said excluding HD information from the HD representation of the surfaces reducing artifacts in the combined-detail representation of the surfaces.

11. The one or more computing devices of claim 1, wherein at least one depth-sensing device is associated with a head-mounted display (HMD).

12. One or more computing devices for generating a digital representation of real-world surfaces in a physical environment, comprising:
hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates, the operations including:
receiving sensor data captured by one or more depth-sensing devices, the sensor data describing distances between a depth-sensing device and the surfaces in the physical environment;
providing a low-detail (LD) representation of the surfaces in the physical environment based on the sensor data, the LD representation of the surfaces describing one or more planes in the physical environment;
generating a high-detail (HD) representation of the surfaces based on the sensor data and the LD representation of the surfaces, said generating involving:
storing plane-proximity information in memory that identifies proximity of different parts of the surfaces to said one or more planes;
identifying, based on the plane-proximity information, high-detail (HD) information that is already represented by the LD representation of the surfaces; and
excluding the HD information, identified by said identifying, from the HD representation of the surfaces, while retaining the HD information in memory; and
providing an output result based on the LD representation of the surfaces and/or the HD representation of the surfaces,
wherein said identifying HD information comprises:
generating a plurality of candidate mesh triangles that describe the surfaces;
for each candidate mesh triangle of the plurality of candidate mesh triangles, determining whether each of its vertices lies within a distance D to a nearest plane, to provide a proximity status for each vertex; and
deciding whether to include each candidate mesh triangle in the HD representation of the surfaces based on the proximity status of its vertices,
wherein said deciding comprises including a candidate mesh triangle if at least one of its vertices lies outside of the distance D to the nearest plane and at least one of its vertices lies within the distance D to the nearest plane, but only after having moved any vertex that lies within the distance D to the nearest plane.

13. A method for generating a digital representation of real-world surfaces in a physical environment, comprising:
receiving sensor data captured by one or more depth-sensing devices, the sensor data describing distances between a depth-sensing device and the surfaces in the physical environment;
providing, using a low-detail (LD) surface extraction component, a low-detail (LD) representation of the surfaces in the physical environment based on the sensor data, the LD representation of the surfaces describing one or more planes in the physical environment;
generating a high-detail (HD) representation of the surfaces based on the sensor data and the LD representation of the surfaces, said generating using a high-detail (HD) surface extraction component, and said generating involving excluding HD information from the HD representation of the surfaces that is determined to be already represented by the LD representation of the surfaces provided by the LD surface extraction component, while retaining the excluded HD information in memory; and
providing an output result based on the LD representation of the surfaces and/or the HD representation of the surfaces,
the method being performed by hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates,
the LD surface extraction component and the HD surface extraction component being two components implemented by the hardware logic circuitry that implement different respective processes configured to provide different kinds of surfaces, the LD surface extraction component implementing a first process for providing the LD representation of the surfaces, and the HD surface extraction component implementing a second process for providing the HD representation of the surfaces based on the LD representation of the surfaces provided by the first process,
the plane-proximity information in memory serving as linking information that relates the LD representation of the surfaces provided by the LD surface extraction component with the HD representation of the surfaces provided by the HD surface extraction component.

14. The method of claim 13, wherein said generating further comprises fusing the sensor data into a plurality of voxels, each voxel of the plurality of voxels representing at least a signed distance function value that identifies a distance to a nearest surface identified by the sensor data.

15. The method of claim 14, further comprising, for each voxel of the plurality of voxels, storing plane-proximity information in memory that identifies: whether the voxel lies within a distance D to a nearest plane identified by the LD representation of the surfaces provided by the LD surface extraction component; and an identity of that nearest plane.

16. The method of claim 13, further comprising identifying the HD information to be excluded by:
    generating a plurality of candidate mesh triangles that describe the surfaces;
    for each candidate mesh triangle of the plurality of mesh triangles, determining whether each of its vertices lies within a distance D to a nearest plane provided by the LD surface extraction component, to provide a proximity status for each vertex; and
    deciding whether to include each candidate mesh triangle in the HD representation of the surfaces based on the proximity status of its vertices.

17. The method of claim 13, further comprising combining the LD representation of the surfaces with the HD representation of the surfaces to provide a combined-detail representation of the surfaces, said excluding HD information from the HD representation of the surfaces reducing artifacts in the combined-detail representation of the surfaces.

18. The method of claim 17, wherein said providing comprises:
    providing the LD representation of the surfaces to a physics engine for use by the physics engine in simulating interaction of a virtual object with the physical environment; and/or
    providing the HD representation of the surfaces and/or the combined-detail representation of the surfaces to a rendering engine for use in correctly rendering the virtual object in relation to any surface in the physical environment that occludes the virtual object.

19. A method for generating a digital representation of real-world surfaces in a physical environment, comprising:
    receiving sensor data captured by one or more depth-sensing devices, the sensor data describing distances between a depth-sensing device and surfaces in a physical environment;
    providing a low-detail (LD) representation of the surfaces in the physical environment based on the sensor data, the LD representation of the surfaces describing one or more planes in the physical environment;
    generating a high-detail (HD) representation of the surfaces based on the sensor data and the LD representation of the surfaces, said generating involving excluding HD information from the HD representation of the surfaces that is determined to be already represented by the LD representation of the surfaces, while retaining the excluded HD information in memory; and
    providing an output result based on the LD representation of the surfaces and/or the HD representation of the surfaces,
    further comprising identifying the HD information to be excluded by:
        generating a plurality of candidate mesh triangles that describe the surfaces;
        for each candidate mesh triangle of the plurality of candidate mesh triangles, determining whether each of its vertices lies within a distance D to a nearest plane, to provide a proximity status for each vertex; and
        deciding whether to include each candidate mesh triangle in the HD representation of the surfaces based on the proximity status of its vertices,
    wherein said deciding comprises:
        for a first case, including a candidate mesh triangle if all of its vertices lie outside of the distance D to the nearest plane;
        for a second case, excluding a candidate mesh triangle if all of its vertices lie within the distance D to the nearest plane; and
        for a third case, including a candidate mesh triangle if at least one of its vertices lies outside of the distance D to the nearest plane and at least one of its vertices lies within the distance D to the nearest plane, but only after having moved any vertex that lies within the distance D to the nearest plane,
    said generating of the HD representation of the surfaces involving all of the first case, the second case, and the third case,
    the method being performed by hardware logic circuitry, the hardware logic circuitry corresponding to: (a) one or more hardware processors that perform operations by executing machine-readable instructions stored in a memory, and/or (b) one or more other hardware logic components that perform the operations using a task-specific collection of logic gates.

20. A computer-readable storage medium for storing computer-readable instructions, the computer-readable instructions, when executed by one or more hardware processors, performing a method that comprises:
    receiving sensor data captured by one or more depth-sensing devices, the sensor data describing distances between a depth-sensing device and surfaces in a physical environment;
    providing, using a low-detail (LD) surface extraction component, a low-detail (LD) representation of the surfaces in the physical environment based on the sensor data, the LD representation of the surfaces describing one or more planes in the physical environment;
    using a high-detail (HD) surface extraction component to:
        fuse the sensor data into a plurality of voxels;
        for each voxel of the plurality of voxels, store plane-proximity information in memory that identifies: whether the voxel lies within a distance D to a nearest plane identified by the LD representation of the surfaces provided by the LD surface extraction component; and an identity of that nearest plane;
        generate, using the voxels, a plurality of candidate mesh triangles that describe the surfaces;
        for each candidate mesh triangle of the plurality of candidate mesh triangles, determine, based on the plane-proximity information associated with the voxels, whether each of its vertices lies within the distance D to a nearest plane provided by the LD extraction component, to provide a proximity status for each vertex;
        deciding whether to include each candidate mesh triangle in a high-detail (HD) representation of the surfaces based on the proximity status of its vertices; and
    providing an output result based on the LD representation of the surfaces and/or the HD representation of the surfaces,
    the LD surface extraction component and the HD surface extraction component being two components implemented by the computer-readable instructions that implement different respective processes configured to provide different kinds of surfaces, the LD surface extraction component implementing a first process for providing the LD representation of the surfaces, and the HD surface extraction component implementing a second process for providing the HD representation of the surfaces based on the LD representation of the surfaces provided by the first process, the plane-proximity information in memory serving as linking information that relates the LD representation of the surfaces provided by the LD surface extraction component with the HD representation of the surfaces provided by the HD surface extraction component.

\* \* \* \* \*